(12) United States Patent
Yumiba et al.

(10) Patent No.: US 8,421,863 B2
(45) Date of Patent: Apr. 16, 2013

(54) IN-VEHICLE IMAGE DISPLAY DEVICE

(75) Inventors: Ryo Yumiba, Hitachi (JP); Masahiro Kiyohara, Hitachi (JP); Tatsuhiko Monji, Hitachinaka (JP); Kota Irie, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 12/844,439

(22) Filed: Jul. 27, 2010

(65) Prior Publication Data

US 2011/0025848 A1 Feb. 3, 2011

(30) Foreign Application Priority Data

Jul. 28, 2009 (JP) ................................. 2009-175745

(51) Int. Cl.
*H04N 7/18* (2006.01)
*H04N 7/00* (2006.01)

(52) U.S. Cl.
USPC ........... 348/148; 348/118; 348/128; 348/137; 348/139

(58) Field of Classification Search .................. 348/118, 348/128, 148, 137, 139
See application file for complete search history.

(56) References Cited

U.S. PATENT DOCUMENTS

| | | | |
|---|---|---|---|
| 6,734,896 B2* | 5/2004 | Nobori et al. | 348/148 |
| 7,139,412 B2* | 11/2006 | Kato et al. | 382/104 |
| 7,161,616 B1 | 1/2007 | Okamoto et al. | |
| 7,495,550 B2* | 2/2009 | Huang et al. | 340/435 |
| 7,760,113 B2* | 7/2010 | Uhler | 340/932.2 |
| 8,082,101 B2* | 12/2011 | Stein et al. | 701/301 |
| 8,170,787 B2* | 5/2012 | Coats et al. | 701/301 |
| 2003/0080877 A1* | 5/2003 | Takagi et al. | 340/932.2 |

FOREIGN PATENT DOCUMENTS

| | | |
|---|---|---|
| EP | 1 065 642 B1 | 1/2001 |
| EP | 2 181 892 A1 | 5/2010 |
| JP | 2000-168475 A | 6/2000 |
| JP | 3300334 B2 | 4/2002 |

(Continued)

OTHER PUBLICATIONS

European Search Report dated Oct. 14, 2010 (Three (3) pages).
Japanese Office Action dated Dec. 6, 2011 (five (5) pages).
Akira Iguchi et al., "Depth Estimation with Stereo Camera Using Monocular Motion Parallax", FIT (Forum of Information Science Technology), 2002, pp. 87-88.

*Primary Examiner* — David Lazaro
*Assistant Examiner* — Farzana Huq
(74) *Attorney, Agent, or Firm* — Crowell & Moring LLP

(57) ABSTRACT

Provided is an in-vehicle image display device capable of providing, from among images of the peripheral area of a vehicle that can change in accordance with the driving state, an image of a part needed by the driver at an appropriate timing so that the driver can recognize the positional relationship between the vehicle and the peripheral area of the vehicle. Images captured with in-vehicle cameras are acquired, and a vehicle periphery image is generated from such images. Then, a collision-warned part of the vehicle that has a possibility of hitting a nearby object is selected based on the vehicle driving state, and the acquired image is processed to generate an enlarged image of the peripheral area of the collision-warned part of the vehicle selected by the collision-warned part selection part. Then, a composite display image, in which the positions of the enlarged image and the vehicle periphery image are displayed in a correlated manner, is generated and displayed.

10 Claims, 24 Drawing Sheets

FOREIGN PATENT DOCUMENTS

| | | |
|---|---|---|
| JP | 2005-123968 A | 5/2005 |
| JP | 2007-201748 A | 8/2007 |
| JP | 2007-288611 A | 11/2007 |
| JP | 2008-17311 A | 1/2008 |
| JP | 2008-306402 A | 12/2008 |
| WO | WO 2009/141846 A1 | 11/2009 |

* cited by examiner

FIG. 11

| Driving state | Collision-warned parts |
|---|---|
| Reverse | Rear part 37 |
| Perpendicular park (Left-in reverse park) | Right front part 32, Right rear part 33, Left rear part 34 |
| Drive past oncoming vehicle (Pulling to the left) | Left front part 31, Right part 36, Left part 38 |
| Parallel park (Left side, First half) | Right front part 32, Left rear part 34 |
| Parallel park (Left side, Second half) | Left front part 31, Left rear part 34, Rear part 37 |
| Drive forward at reduced speed | Front part 35 |
| Forward park (Left-in) | Left front part 31, Right front part 32, Left part 38 |

FIG. 12

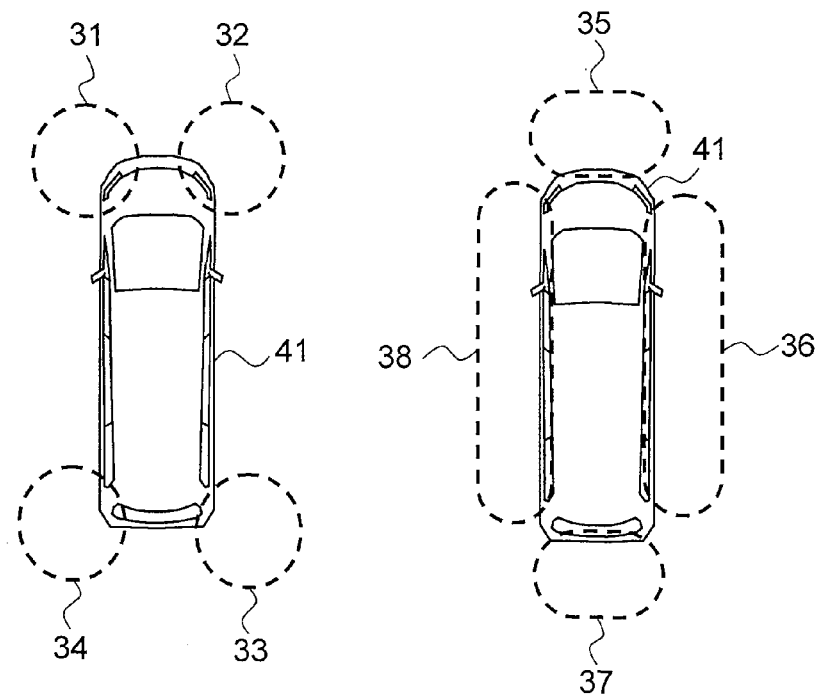

FIG. 13

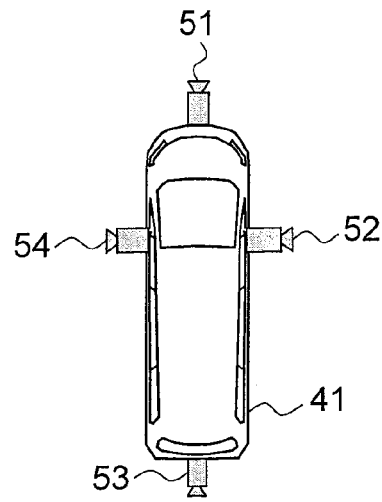

FIG. 14

| Collision-wanred parts of vehicle 41 | Corresponding camera | Cutout area |
|---|---|---|
| Left front part 31 | Camera 54 on left part | Xfl0,Yfl0,Xfl1,Yfl1 |
| Right front part 32 | Camera 52 on right part | Xfr0,Yfr0,Xfr1,Yfr1 |
| Right rear part 33 | Camera 53 on rear part | Xbr0,Ybr0,Xbr1,Ybr1 |
| Left rear part 34 | Camera 53 on rear part | Xbl0,Ybl0,Xbl1,Ybl1 |
| Front part 35 | Camera 51 on front part | Xf0,Yf0,Xf1,Yf1 |
| Right part 36 | Camera 52 on front part | Xr0,Yr0,Xr1,Yr1 |
| Rear part 37 | Camera 53 on front part | Xb0,Yb0,Xb1,Yb1 |
| Left part 38 | Camera 54 on front part | Xl0,Yl0,Xl1,Yl1 |

IN-VEHICLE IMAGE DISPLAY DEVICE

BACKGROUND OF THE INVENTION

1. Field of the Invention

The present invention relates to an in-vehicle image display device that displays images captured with in-vehicle cameras.

2. Background Art

Display systems that display an image of the peripheral area of a vehicle to assist drivers in checking the peripheral area of the vehicle have been in widespread use, in which a wide-angle camera is mounted on the vehicle and an image captured with the camera is displayed on a monitor installed on the side of the driver's seat. Typical among monitors installed on the driver's seat are compact monitors with a screen size of about 7 to 10 inches due to the restrictions of the interior room space of the vehicle.

A display system that displays an image of the peripheral area of a vehicle has one or more cameras mounted on the vehicle. When two or more cameras are mounted on the vehicle with such a display system that displays an image of the peripheral area of the vehicle, a monitor installed on the side of the driver's seat is configured to display one of the camera images with a manual switching operation of the driver, display two or more camera images side-by-side, or display a single image formed by combining the two or more camera images.

Reference 1 (JP Patent Publication (Kokai) No. 2007-288611 A) discloses a technique for processing images captured with wide-angle cameras that are installed on the four sides, including the front side, rear side, left side, and right side, of a vehicle with a signal processing device, displaying a top-view image formed through a viewpoint conversion process such that the resulting image appears to be viewed from a virtual viewpoint right above the vehicle, and displaying alongside the top-view image at least one of the images captured with the cameras on the front side, rear side, left side, and right side of the vehicle.

A top-view image is an image formed by combining the camera images of the front side, rear side, left side, and right side of the vehicle based on the ground surface around the vehicle as a reference. Using a top-view image is advantageous in that the driver can recognize at a glance the conditions of the entire peripheral area of the vehicle, while it is also disadvantageous in that stereoscopic objects could be displayed in a distorted manner as a result of the viewpoint conversion and an image of the area above the ground surface could not be not displayed.

According to Reference 1, images captured with the cameras installed on the front side, rear side, left side, and right side of the vehicle are displayed alongside the top-view image to compensate for the aforementioned disadvantages of the top-view image. Specifically, Reference 1 discloses a technique of selecting a camera image to be displayed alongside the top-view image in accordance with the vehicle speed or the vehicle travelling direction. For example, when the vehicle drives in reverse to the right, the cameras on the right side and rear side of the vehicle are selected.

With regard to a display system that displays an image of the peripheral area of a vehicle using a top-view image, Reference 2 discloses a method using an obstacle sensor installed on the vehicle, which includes enlarging and displaying, upon detection of an obstacle around the vehicle with the obstacle sensor, the peripheral area of the detected obstacle around the vehicle on the top-view image.

SUMMARY OF THE INVENTION

According to the technique of Reference 1, a camera image to be displayed alongside the top-view image is switched based on the vehicle traveling direction as a reference. However, while driving a vehicle, the driver should carefully watch not only the vehicle travelling direction but also the entire peripheral area, including the front side, rear side, left side, and right side, of the vehicle to avoid a collision with a nearby structure or another vehicle. Further, a portion of the vehicle to which the driver should carefully watch to avoid a collision with another vehicle could change from moment to moment in accordance with the vehicle driving state. Thus, with the technique disclosed in Reference 1, a shortage of images needed by the driver may occur (the first problem).

Further, with the technique of Reference 1, there is also a concern that the driver, when viewing the top-view image and the camera images on the right side, rear side, left side, and right side of the vehicle captured from different viewpoints, may not easily recognize the correspondence relationship between the top-view image and the camera images (the second problem). In particular, the second problem is considered to assume more importance in the conditions that the driver should carefully maneuver the vehicle or watch the positional relationship between the vehicle and a parking bay for parking the vehicle while parking.

Next, with the technique of Reference 2, if the top-view is enlarged too close to the obstacle, it would be difficult for the driver to recognize the position of the obstacle in relation to the vehicle. Meanwhile, if the enlarged degree of the top-view image is too small, the driver would not be able to visually check the obstacle unless he/she pays particular attention to the obstacle. The currently-available monitors for display systems that display an image of the peripheral area of a vehicle are as small as 7 to 10 inches in size as described above, and it is still unlikely that such monitor size would increase in future due to the restrictions on the installation space. Thus, the technique of Reference 2 poses a third problem that lies in the difficulty of recognizing the positional relationship between the vehicle and the obstacle while at the same time displaying a detailed image of the obstacle.

The present invention has been made in view of the aforementioned. It is an object of the present invention to provide an in-vehicle image display device that is capable of providing, from among images of the peripheral area of the vehicle that can change in accordance with the driving state, an image of a part needed by the driver at an appropriate timing so that the driver can recognize the positional relationship between the vehicle and the peripheral area of the vehicle.

A periphery image display device in accordance with the present invention that solves the aforementioned problems is an in-vehicle image display device that displays images captured with a plurality of in-vehicle cameras, which includes an image acquisition unit configured to acquire images captured with the in-vehicle cameras, a vehicle periphery image generation unit configured to generate an image of the peripheral area of the vehicle based on the images acquired with the image acquisition unit, a collision-warned part selection unit configured to select a collision-warned part of the vehicle that has a possibility of hitting a nearby object around the vehicle based on a driving state of the vehicle, an enlarged image generation unit configured to process at least one of the images acquired with the image acquisition unit to generate an enlarged image of a peripheral area of the collision-warned part of the vehicle selected by the collision-warned part selection unit, a composite display image generation unit configured to generate a composite display image composed of the enlarged image generated by the enlarged image generation unit and the image of the peripheral area of the vehicle generated by the vehicle periphery image generation unit, the composite display image being displayed in a form in which positions of the enlarged image and the image of the peripheral area of the vehicle are correlated with each other, and a display unit configured to display the composite display image generated by the composite display image generation unit.

According to the present invention, a collision-warned part of a vehicle that has a possibility of hitting a nearby object around the vehicle is selected based on the vehicle driving state, and an enlarged image of the peripheral area of the selected collision-warned part of the vehicle and the image of the peripheral area of the vehicle are displayed in a form in which the positions thereof are correlated with each other. Thus, it is possible to provide, from among images of the peripheral area of the vehicle that can change in accordance with the driving state, an image of a part needed by the driver at an appropriate timing so that the driver can recognize the positional relationship between the vehicle and the peripheral area of the vehicle.

BRIEF DESCRIPTION OF THE DRAWINGS

FIG. 11 is a diagram showing an example of a reference table that indicates the collision-warned parts in accordance with the driving state.

FIG. 12 shows an exemplary list of the collision-warned parts of a vehicle.

FIG. 13 is a diagram showing an example of the positions for installing cameras on a vehicle.

FIG. 14 is a diagram showing an exemplary correspondence table that defines the relationship between a corresponding camera and an area cut out from an image captured with the camera in accordance with the collision-warned part of the vehicle.

DESCRIPTION OF SYMBOLS

Figure 1:
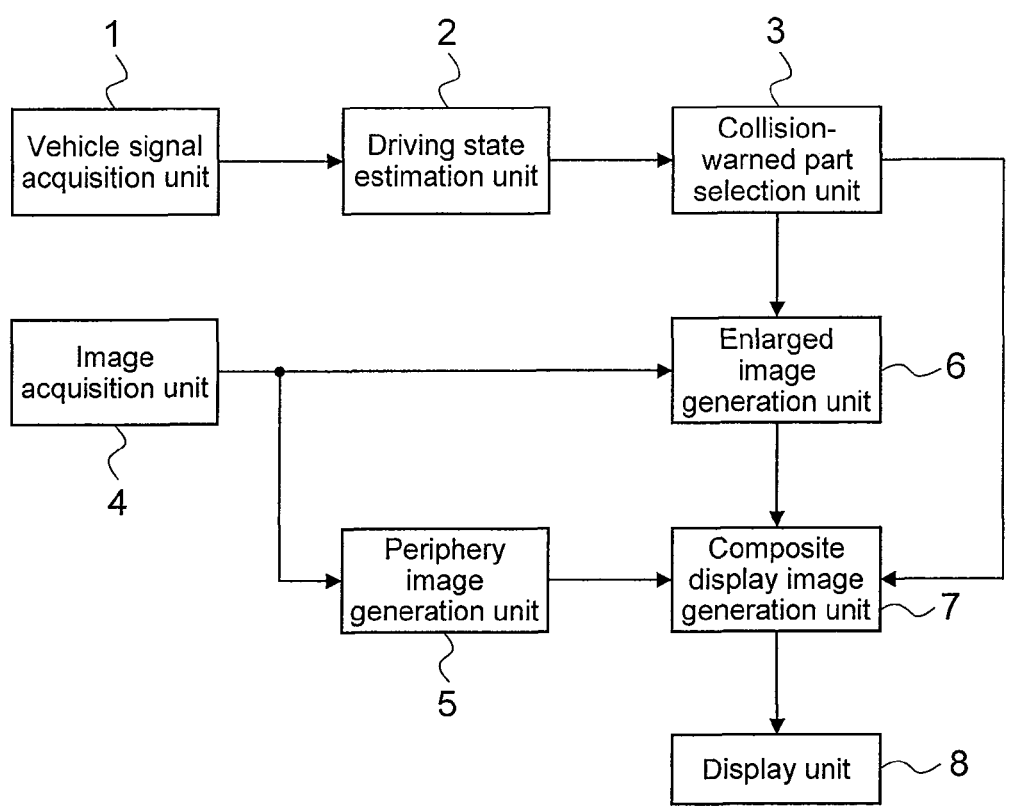
FIG. 1 is a functional block diagram of a periphery image display device in accordance with Embodiment 1.

1 vehicle signal acquisition unit
2 driving state estimation unit
3 collision-warned part reference unit
4 image acquisition unit
5 periphery image generation unit
6 enlarged image generation unit
7 composite display image generation unit
8 display unit
9 nearby object recognition unit
10 nearby object sensor
11 vehicle signal estimation unit
41 vehicle
45 oncoming vehicle
60 gutter
61, 62, 81, 82, 91, 92 parked vehicles
63 guard rail
70, 80, 90 parking bays
83 curb 100 vehicle periphery image (top-view image)
101 display space
102 composite display image
141 icon
154 arcuate line
164 semi-transparent portion
232, 233, 234 enlarged images
254 elliptical lines
264 semi-transparent image
332, 333, 334 markers
432, 433, 434 connecting lines

DETAILED DESCRIPTION OF THE PREFERRED EMBODIMENTS

Hereinafter, specific embodiments of the in-vehicle image display device in accordance with the present invention will be described with reference to the accompanying drawings. Although this embodiment will describe an automobile as an example of a vehicle, "vehicles" in accordance with the present invention are not limited to automobiles and can include a variety of kinds of moving objects that drive on the ground surface.

[Embodiment 1]

FIG. 1 is a functional block diagram of an in-vehicle image display device in accordance with Embodiment 1. The in-vehicle image display device is realized in a vehicle that includes at least one in-vehicle camera installed on the vehicle (hereinafter referred to as a camera), a computer(s) mounted within at least one of the camera and the vehicle and having a arithmetic device, main storage, and a storage medium, and at least one monitor screen such as a car navigation screen or a speaker.

The in-vehicle image display device includes, as shown in FIG. 1, functions of a vehicle signal acquisition unit 1, a driving state estimation unit 2, a collision-warned part selection unit 3, an image acquisition unit 4, a periphery image generation unit 5, an enlarged image generation unit 6, a composite display image generation unit 7, and a display unit 8.

The functions of the vehicle signal acquisition unit 1, the driving state estimation unit 2, the collision-warned part selection unit 3, the image acquisition unit 4, the periphery image generation unit 5, the enlarged image generation unit 6, and the composite display image generation unit 7 are realized with one or both of the computers within the camera and the vehicle. The function of the display unit 8 is realized with at least one of a monitor screen such as a car navigation screen or a speaker within the vehicle.

The in-vehicle image display device performs a process of selecting as a collision-warned part a part of the vehicle that has a possibility of hitting a nearby object by acquiring a vehicle signal of the vehicle with the vehicle signal acquisition unit 1, estimating the vehicle driving state based on the time series of the vehicle signal with the driving state estimation unit 2, and referring to a reference table set in advance with the collision-warned part selection unit 3 based on the vehicle driving state.

Then, the in-vehicle image display device acquires images captured with the cameras installed on the vehicle with the image acquisition unit 4, generates an image of the peripheral area of the vehicle with the periphery image generation unit 5 based on the camera images, and generates an enlarged image of the peripheral area of the collision-warned part with the enlarged image generation unit 6.

Then, the in-vehicle image display device performs a process of generating a composite display image that is composed of both the vehicle periphery image and the enlarged image and represents the correspondence relationship between the periphery image and the enlarged image. That is, the in-vehicle image display device performs a process of generating a composite display image that can be displayed in a form in which the positions of the periphery image and the enlarged image are correlated with each other, and displaying such a composite display image with the display unit 8.

Next, each of the aforementioned functions will be described in detail.

The vehicle signal acquisition unit 1 acquires vehicle signals such as the vehicle speed, gear position, and steering angle from vehicle sensors or a control device (e.g., acquires the vehicle speed from a vehicle speed sensor of a vehicle wheel or the like, acquires the gear position from a gear control device, and acquires the steering angle from a steering angle sensor) at predetermined time intervals.

The driving state estimation unit 2 constantly reads vehicle signals acquired with the vehicle signal acquisition unit 1 at predetermined time intervals, and estimates a vehicle driving state from the time series of the vehicle signals. For example, the driving state estimation unit 2 can estimate a driving state such as a driving state in perpendicular parking (FIG. 2 and FIGS. 3A to 3E), a driving state in pulling alongside an oncoming vehicle (FIG. 4 and FIGS. 5A to 5D), a driving state in parallel parking (FIG. 6 and FIGS. 7A to 7E), or a driving state in forward parking (FIG. 8 and FIGS. 9A to 9E).

Figure 2:
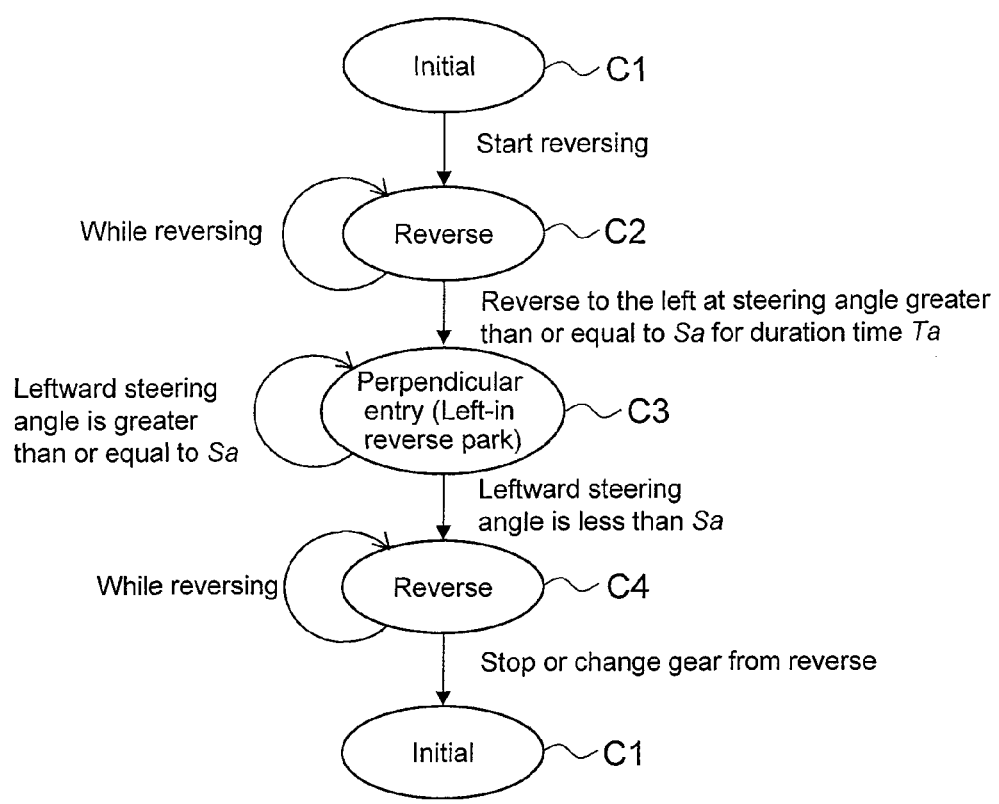
FIG. 2 is a state transition diagram for estimating a driving state in perpendicular parking (left-in reverse parking).

First, a method for estimating a driving state in perpendicular parking (left-in reverse parking) will be described with reference to FIG. 2 and FIGS. 3A to 3E. FIG. 2 is a state transition diagram showing a transition of the vehicle driving state in perpendicular parking (left-in reverse parking), and FIGS. 3A to 3E show sequential transitions of the vehicle driving state in perpendicular parking (left-in reverse parking), as an exemplary sequence of the driving states in and before/after perpendicular parking (left-in reverse parking).

In FIGS. 3A to 3E, reference numeral 41 denotes a vehicle, reference numeral 40 denotes the vehicle 41 before the movement, reference numeral 60 denotes a gutter, reference numerals 61 and 62 denote vehicles parked on the opposite sides of a parking bay in which the vehicle 41 is to be parked, and reference numeral 70 denotes a parking bay in which the vehicle 41 is to be parked. The gutter 60 without a cover is located opposite the parking bay 70 with a passageway therebetween.

The driving state estimation unit 2 constantly keeps determining a state transition based on the time series of vehicle signals acquired with the vehicle signal acquisition unit 1, from the time the engine of the vehicle 41 is started till it is stopped. In the state transition diagram of FIG. 2, the vehicle is initially in an initial state C1.

In the state transition diagram of FIG. 2, when it is determined from a vehicle signal of the vehicle signal acquisition unit 1 that the vehicle 41 is in reverse gear and the vehicle speed is greater than or equal to 0, the vehicle state transitions from the initial state C1 to a reverse state C2. The reverse state C2 corresponds to the scene of FIG. 3A in the exemplary sequence of the driving states in and before/after perpendicular parking (left-in reverse parking) shown in FIG. 3A to FIG. 3E. In the reverse state C2, it is presumed that the driver is determining the timing of when to start steering while recognizing the positional relationship between the parking bay 70 and the vehicle 41. In the reverse state C2, the vehicle 41 moves substantially straight back. Thus, the rear part 37 of the vehicle 41 may hit a nearby object.

After the vehicle has entered the reverse state C2 in the state transition diagram of FIG. 2, when the reverse driving at a leftward steering angle greater than or equal to a steering angle Sa has lasted for a time duration greater than or equal to Ta, the vehicle state transitions to a perpendicular entry state C3. While the steering angle is leftward and is greater than or equal to the steering angle Sa, the perpendicular entry state C3 is continued.

Figure 3A:
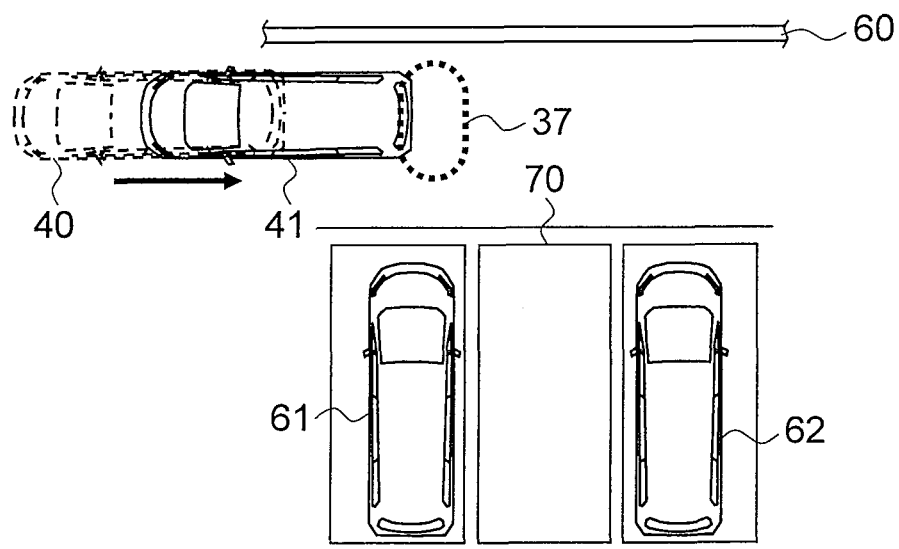
FIG. 3A is a diagram showing a driving state transition in perpendicular parking (left-in reverse parking).
Figure 3B:
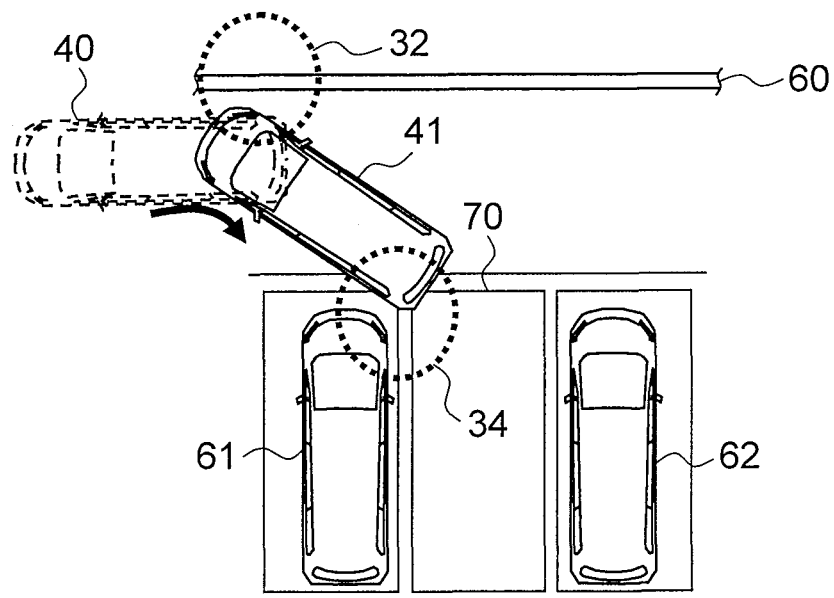
FIG. 3B is a diagram showing a driving state transition in perpendicular parking (left-in reverse parking).
Figure 3C:
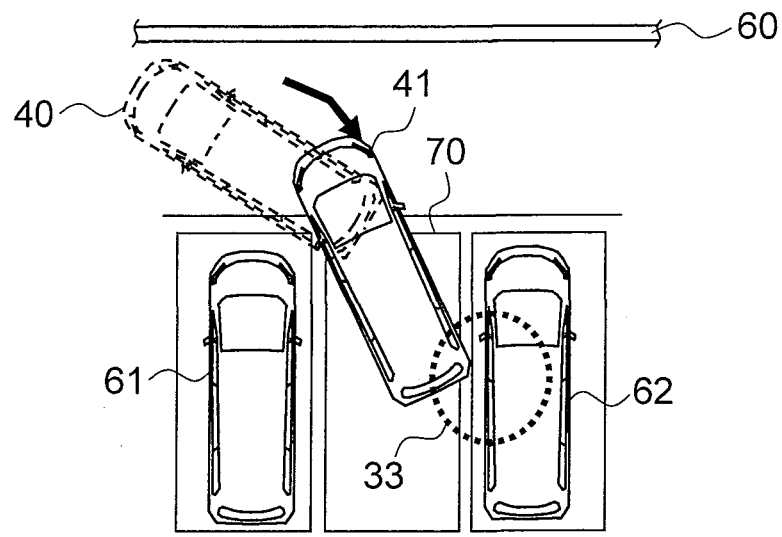
FIG. 3C is a diagram showing a driving state transition in perpendicular parking (left-in reverse parking).

The perpendicular entry state C3 corresponds to the scenes of FIG. 3B and FIG. 3C in the exemplary sequence of the driving states in and before/after perpendicular parking (left-in reverse parking) shown in FIG. 3A to FIG. 3E. It should be noted that the steering angle Sa and the time duration Ta are the thresholds set in advance. The steering angle Sa is set large to a certain extent, i.e., a steering angle required to swing the rear part 37 of the vehicle 41 into the parking bay 70 in perpendicular parking. The length of the time duration Ta is determined by estimating the time duration that is long enough to avoid mistakenly responding to the driver's instantaneous adjustment of the steering.

In the perpendicular entry state C3, it is presumed that the vehicle 41 is swinging to the left at a large steering angle and entering the parking bay 70 from the side of the rear part 37 of the vehicle 41. The scene of FIG. 3B corresponds to the timing of when the left rear part 34 of the vehicle 41 is entering the parking bay 70. Thus, the left rear part 34 of the vehicle 41 may hit the vehicle 61, and the right front part 32 of the vehicle 41 may also hit the gutter 60.

The hit of the left rear part 34 of the vehicle 41 against the vehicle 61 can result in a collision accident, and the hit of the right front part 32 of the vehicle 41 against the gutter 60 can result in the tire coming off the wheel. Thus, the driver should carefully maneuver the vehicle. The scene of FIG. 3C corresponds to a state in which the vehicle 41 has more deeply entered the parking bay 70 than in FIG. 3B. Thus, the right rear part 33 of the vehicle may hit the vehicle 62.

In the perpendicular entry state C3 in the state transition diagram of FIG. 2, when the leftward steering angle has become smaller than the steering angle Sa, the vehicle state transitions to a reverse state C4. After the vehicle has entered the reverse state C4 in the state transition diagram of FIG. 2, the reverse state C4 is continued while the vehicle 41 is reversing.

In the reverse state C4, it is presumed that the vehicle 41 is advancing deeper after the vehicle 41 is positioned substantially parallel with the parking bay 70 with the driver's turn of the steering wheel at a large steering angle. The reverse state C4 corresponds to the scenes of FIG. 3D and FIG. 3E in the exemplary sequence of the driving states in and before/after perpendicular parking (left-in reverse parking) shown in FIG. 3A to FIG. 3E.

Figure 3D:
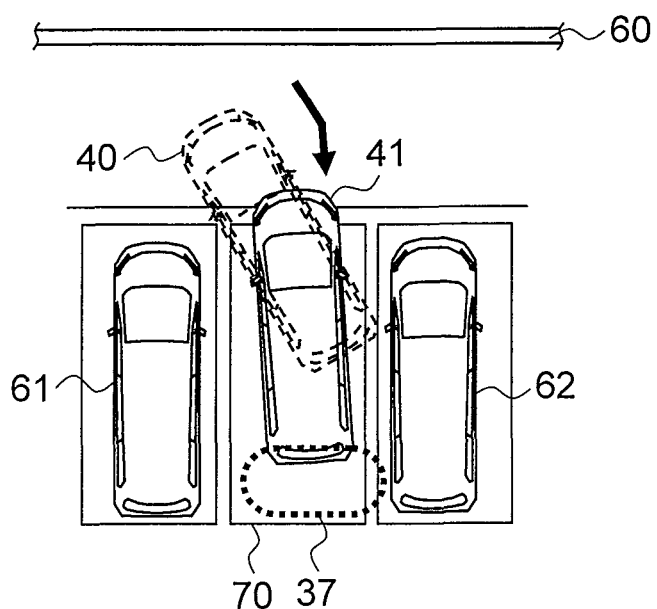
FIG. 3D is a diagram showing a driving state transition in perpendicular parking (left-in reverse parking).
Figure 3E:
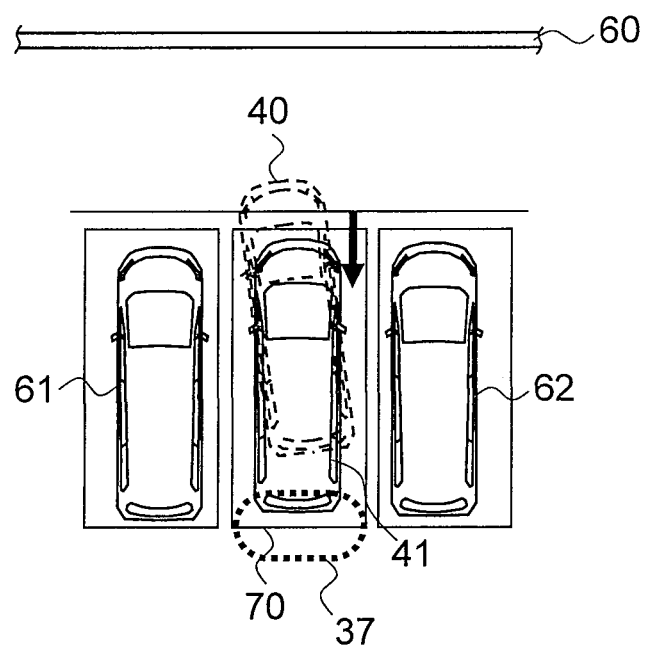
FIG. 3E is a diagram showing a driving state transition in perpendicular parking (left-in reverse parking).

FIG. 3D shows a scene in which the vehicle 41 is advancing towards the rear end of parking bay 70 with the steering turned back after the scene of FIG. 3C. FIG. 3E shows a scene in which the vehicle stop position is adjusted so that the rear part 37 of the vehicle 41 is positioned around the rear end of the parking bay 70. In the scenes of FIG. 3D and FIG. 3E, the vehicle 41 moves substantially straight back. Thus, the rear part 37 of the vehicle 41 may hit an object existing around the rear end of the parking bay 70 such as a curb or wall (not shown).

In the reverse state C4 in the state transition diagram shown in FIG. 2, when the vehicle 41 has stopped or when the gear is changed from reverse to forward, it is presumed that the vehicle 41 has been successfully parked in the parking bay 70 or the vehicle 41 is about to once move forward with a driver's reattempt to park the vehicle 41 into the parking bay 70, whereby the driving state in perpendicular parking (left-in reverse parking) is determined to have ended. Accordingly, the vehicle state goes back to the initial state C1.

Figure 4:
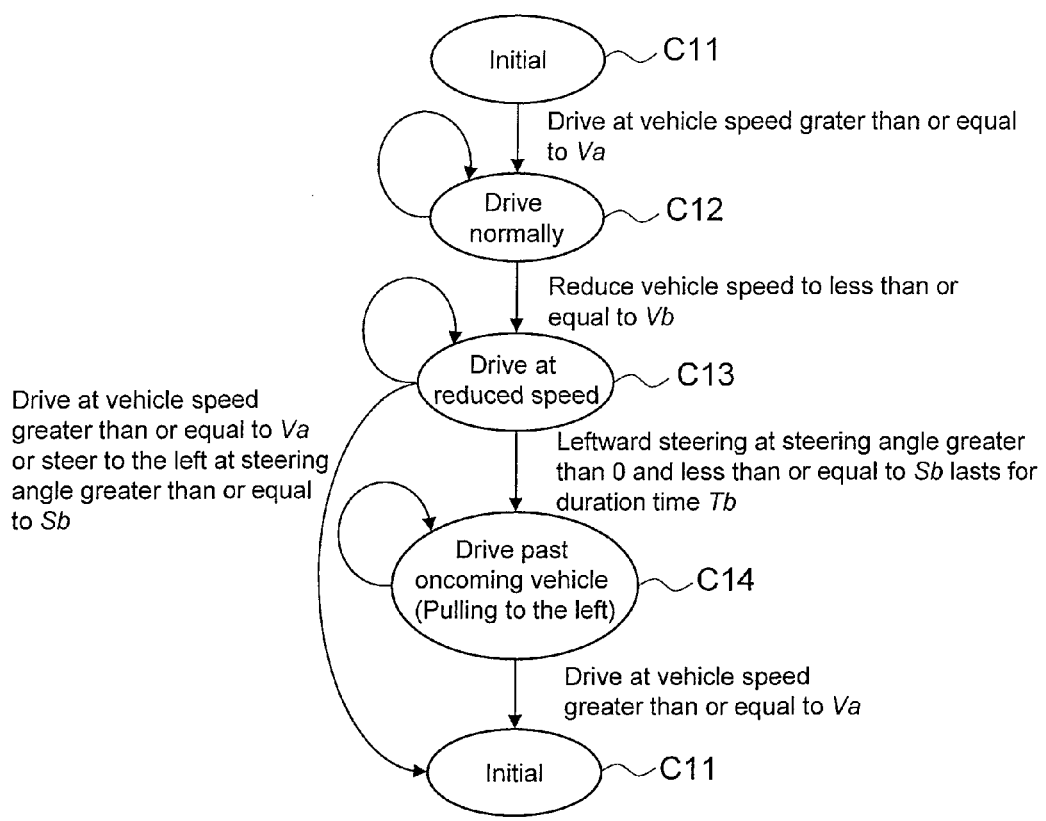
FIG. 4 is a state transition diagram for estimating a driving state in driving past an oncoming vehicle (pulling to the left).

Described next with reference to FIG. 4 and FIGS. 5A to 5D as an example of estimating a driving state is a method for estimating a driving state in pulling the vehicle 41 to the left on a narrow road to allow the vehicle to drive past an oncoming vehicle. FIG. 4 is a state transition diagram for estimating with the driving state estimation unit a sequence of the driving states in and before/after pulling the vehicle to the left on a narrow road to allow the vehicle to drive past an oncoming vehicle. FIGS. 5A to 5D show sequential transitions of the vehicle driving state when the vehicle drives past an oncoming vehicle, as an exemplary sequence of the driving states in and before/after driving past an oncoming vehicle. In FIGS. 5A to 5D, reference numeral 45 denotes an oncoming vehicle, reference numeral 63 denotes a guard rail, reference numeral 36 denotes the right part of the vehicle 41, reference numeral 38 denotes the left pat of the vehicle 41, and reference numeral 31 denotes the left front part of the vehicle 41.

The driving state estimation unit 2 constantly keeps determining a state transition based on the time series of vehicle signals acquired with the vehicle signal acquisition unit 1, from the time the engine of the vehicle 41 is started till it is stopped. In the state transition diagram of FIG. 4, the vehicle is initially in an initial state C11.

In the initial state C11 in the state transition diagram of FIG. 4, the vehicle state will transition to a normal driving state C12 when the vehicle speed V has become greater than or equal to a vehicle speed Va. The vehicle speed Va is the threshold set in advance by estimating the slowest vehicle speed at which the vehicle can be regarded as driving smoothly on the public road. In the normal driving state C12 in the state transition diagram of FIG. 4, the vehicle 41 is regarded as driving smoothly.

In the normal driving state C12 in the state transition diagram of FIG. 4, the vehicle state will transition to a reduced-speed driving state C13 when the vehicle speed V of the vehicle signal has become less than or equal to a vehicle speed Vb. The vehicle speed Vb is the threshold set in advance by estimating the vehicle speed at which the driver carefully drives the vehicle to avoid a collision with nearby objects.

In the state transition diagram of FIG. 4, when the vehicle state has transitioned from the normal driving state C12 to the reduced-speed driving state C13, it is recognized that the driver has reduced the speed of the vehicle 41 for some purposes although such purposes (e.g., as the driver has reached the tail of the traffic jam or as the driver has reduced the vehicle speed to stop at a traffic light) are unknown.

Figure 5A:
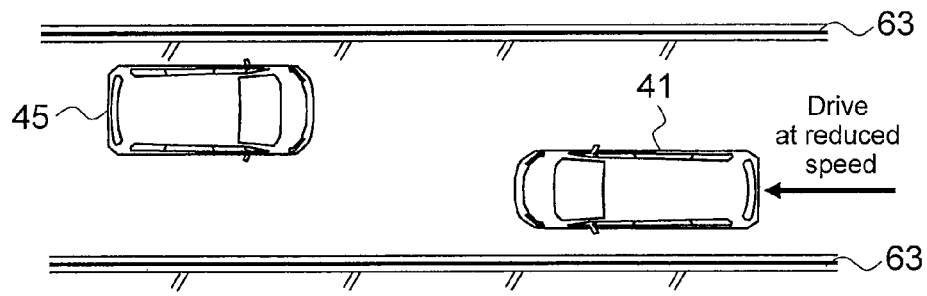
FIG. 5A is a diagram showing a driving state transition in driving past an oncoming vehicle (pulling to the left).

The reduced-speed driving state C13 corresponds to the scene of FIG. 5A in the exemplary sequence of the driving states in and before/after driving past an oncoming vehicle (pulling to the left) shown in FIG. 5A to FIG. 5D, in which the driver is reducing the speed of the vehicle 41 in preparation for driving past the oncoming vehicle 45.

In the reduced-speed driving state C13 in the state transition diagram of FIG. 4, when the following state: the steering angle S indicated by a vehicle signal is leftward and is greater than 0 and less than or equal to a steering angle Sb has lasted for a time duration greater than or equal to Tb, the vehicle state transitions to a passing (pulling to the left) state C14.

The steering angle Sb is the threshold set in advance by estimating the steering angle of when the driver pulls the vehicle 41 alongside an oncoming vehicle to finely adjust the horizontal position of the vehicle 41 within the lane. The steering angle Sb is set smaller than the large steering angle of when, for example, the vehicle makes a left turn at an intersection.

The time duration Tb is the threshold set in advance such that it is longer than the time required to steer the vehicle instantaneously to change lanes, for example. When the vehicle is in the passing state C14 in the state transition diagram of FIG. 4, the passing state C14 is continued until the vehicle speed V of the vehicle signal exceeds a predetermined vehicle speed Va.

In the passing state C14, it is presumed that the driver is carefully passing alongside the oncoming vehicle 45 while finely adjusting the steering with the reduced speed of the vehicle 41. The passing state C14 corresponds to the scenes of FIG. 5B and FIG. 5C in the exemplary sequence of the driving states in and before/after driving past an oncoming vehicle (pulling to the left) shown in FIG. 5A to FIG. 5D.

Figure 5B:
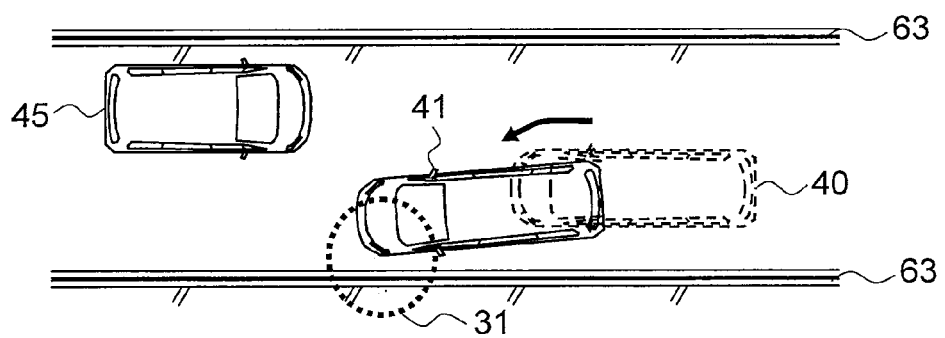
FIG. 5B is a diagram showing a driving state transition in driving past an oncoming vehicle (pulling to the left).
Figure 5C:
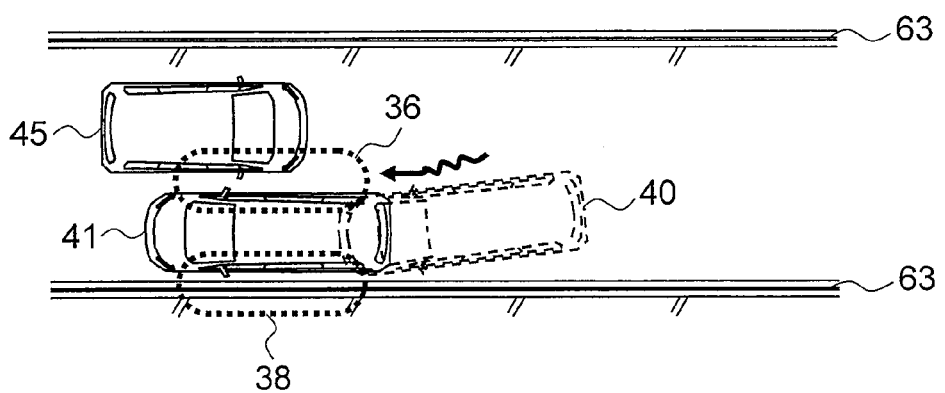
FIG. 5C is a diagram showing a driving state transition in driving past an oncoming vehicle (pulling to the left).
Figure 5D:
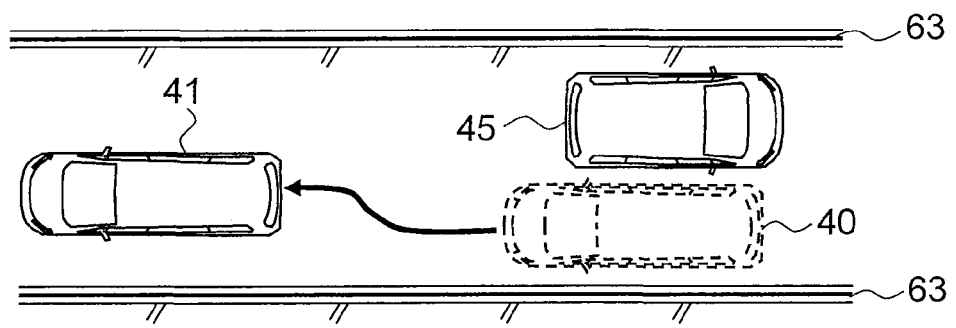
FIG. 5D is a diagram showing a driving state transition in driving past an oncoming vehicle (pulling to the left).

FIG. 5B shows a state in which the vehicle 41 is steered away from the oncoming vehicle 45 towards the guard rail 63. FIG. 5C shows a state in which the vehicle 41 is passing between the oncoming vehicle 45 and the guard rail 63 with the steering of the vehicle 41 turned back to center.

In the scene of FIG. 5B, the left front part 31 of the vehicle 41 may hit the guard rail 63. Meanwhile, in the scene of FIG. 5C, the right part 36 and the left part 38 of the vehicle 41 may hit the oncoming vehicle 45 and the guard rail 63, respectively.

In the passing (pulling to the left) state C14 in the state transition diagram of FIG. 4, when the vehicle speed V of the vehicle signal has exceeded the vehicle speed Va, it is recognized that the vehicle has got out of the passing (pulling to the left) state C14, an thus the vehicle state returns back to the initial state C11. The passing state C14 corresponds to the scenes of FIG. 5B and FIG. 5C in the exemplary sequence of the driving states in and before/after driving past driving an oncoming vehicle shown in FIG. 5A to FIG. 5D, in which the vehicle 41 is driving after having passed alongside the oncoming vehicle 45.

In the reduced-speed driving state C13 in the state transition diagram of FIG. 4, when the vehicle speed V of the vehicle signal has increased to greater than or equal to the vehicle speed Va or when the leftward steering angle S of the vehicle signal has exceeded the steering angle Sb, it is recognized that the vehicle state has transitioned to a driving state different from the passing (pulling to the left) state, and thus the vehicle state goes back to the initial state C11.

Figure 6:
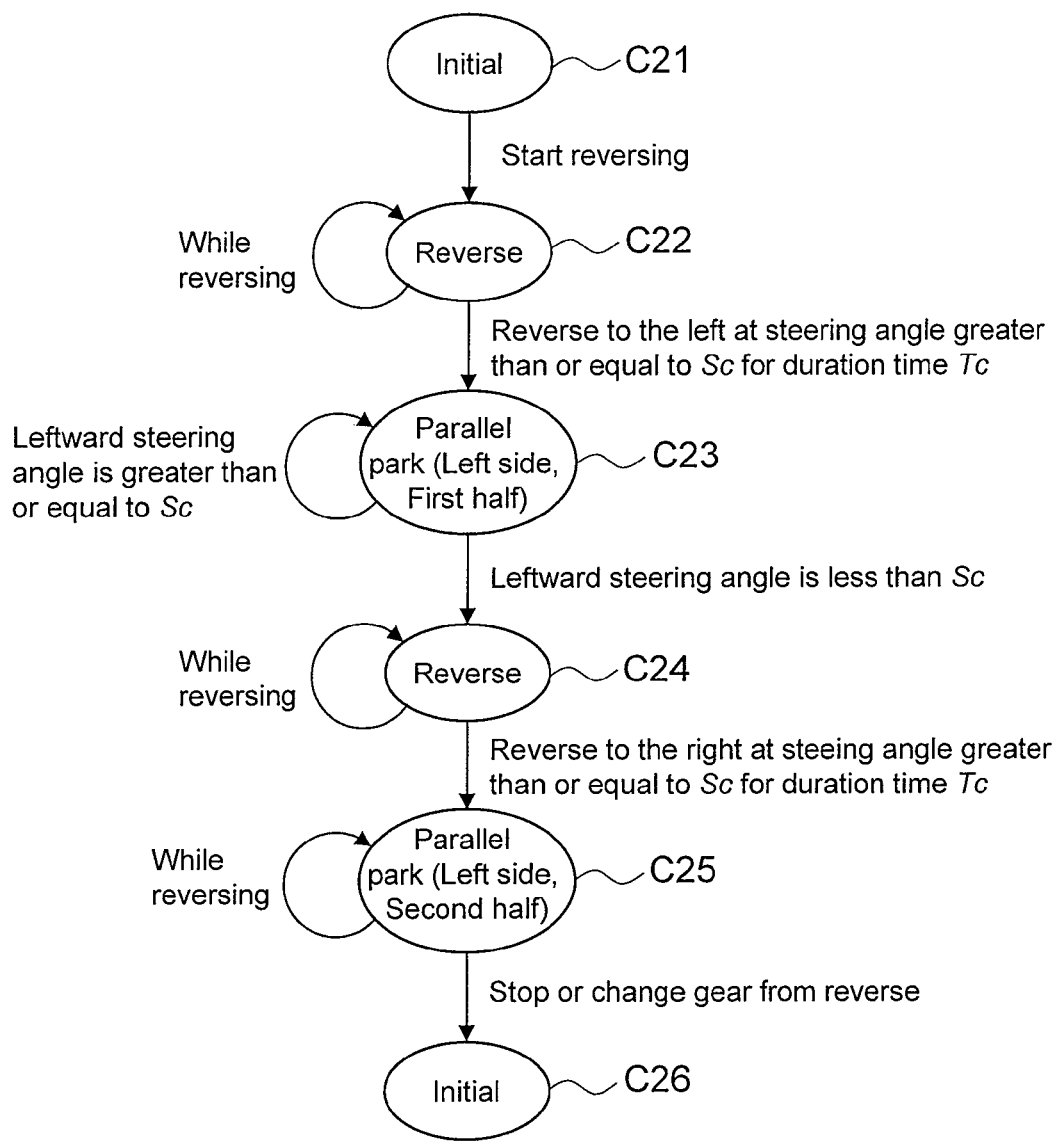
FIG. 6 is a state transition diagram for estimating a driving state in parallel parking (left side).

Described next with reference to FIG. 6 and FIGS. 7A to 7E as an example of estimating a driving state is a method for estimating a driving state in parallel parking. FIG. 6 is a state transition diagram for estimating a sequence of the driving states in and before/after parallel parking a vehicle into a parking bay on the left side, i.e., the driving states in and before/after parallel parking (left side, the first half) and parallel parking (left side, the second half).

FIG. 7A to FIG. 7E show an exemplary sequence of the driving states in and before/after parallel parking (left side, the first half) and parallel parking (left side, the second half). Reference numeral 80 denotes a parking bay in which the vehicle 41 is to be parked, reference numerals 81 and 82 denote vehicles parked on the opposite sides of the parking bay 80, and reference numeral 83 denotes a curb.

The driving state estimation unit 2 constantly keeps determining a state transition based on the time series of vehicle signals acquired with the vehicle signal acquisition unit 1, from the time the engine of the vehicle 41 is started till it is stopped. In the state transition diagram of FIG. 6, the vehicle is initially in an initial state C21.

In the state transition diagram of FIG. 6, when it is determined from a vehicle signal of the vehicle signal acquisition unit 1 that the vehicle 41 is put in reverse gear and the vehicle speed is greater than or equal to 0, the vehicle state transitions from the initial state C21 to a reverse state C22. The reverse state C22 corresponds to the scene of FIG. 7A in the exemplary sequence of the driving states in and before/after parallel parking shown in FIG. 7A to FIG. 7E. In the reverse state C22, it is presumed that the driver is determining the timing of when to start steering while recognizing the positional relationship between the parking bay 80 and the vehicle 41. In the reverse state C22, the vehicle 41 moves substantially straight back. Thus, the rear part 37 of the vehicle 41 may hit a nearby object.

After the vehicle has entered the reverse state C22 in the state transition diagram of FIG. 6, when the reverse driving at a leftward steering angle greater than or equal to a steering angle Sc has lasted for a time duration greater than or equal to Tc, the vehicle state transitions to a parallel parking (left side, the first half) state C23. While the steering angle is leftward and is greater than or equal to the steering angle Sc, the parallel parking (left side, the first half) state C23 is continued. The parallel parking state C23 corresponds to the scene of FIG. 7B in the exemplary sequence of the driving states in and before/after parallel parking shown in FIG. 7A to FIG. 7E. It should be noted that the steering angle Sc and the time duration Tc are the thresholds set in advance. The steering angle Sc is set large to a certain extent, i.e., a steering angle required to swing the rear part 37 of the vehicle 1 into the parking bay 80 in parallel parking. The length of the time duration Tc is set long enough to determine that the driver is steering the vehicle for parallel parking, not adjusting the steering instantaneously.

In the parallel parking (left side, the first half) state C23, it is presumed that the vehicle 41 is being parked into the parking bay 80 from the side of the rear part 37 with a swing of the vehicle 41 to the left. The scene of FIG. 7B corresponds to the timing of when the left rear part 34 of the vehicle is about to enter the parking bay 80. Thus, the left rear part 34 of the vehicle 41 may hit the vehicle 81, and the right front part 32 of the vehicle 41 may also hit the curb 84. As the hit of the vehicle 41 against the vehicle 61 and the hit of the vehicle 41 against the curb 84 can result in a collision accident and damage to the vehicle 41, the driver should carefully maneuver the vehicle.

In the parallel parking (left side, the first half) state C23 in the state transition diagram of FIG. 6, when the leftward steering angle has become smaller than the steering angle Sc, the vehicle state transitions to a reverse state C24. After the vehicle has entered the reverse state C24 in the state transition diagram of FIG. 6, the reverse state C24 is continued while the vehicle 41 keeps driving backwards. The reverse state C24 in the sequence of FIG. 7 corresponds to the scene of FIG. 7C.

In the reverse state C24, it is presumed that the driver is determining the timing of when to turn the steering back to the right by switching the vehicle state from the parallel parking (left side, the first half) state C23. In the reverse state C24, the vehicle 41 moves substantially straight back. Thus, the rear part 37 of the vehicle 41 may hit a nearby object.

After the vehicle has entered the reverse state C24 in the state transition diagram of FIG. 6, when the reverse driving at a rightward steering angle greater than or equal to the steering angle Sc has lasted for a time duration greater than or equal to Tc, the vehicle state transitions from the reverse state C24 to a parallel parking (left side, the second half) state C25.

While the vehicle 41 keeps driving backwards, the parallel parking (left side, the second half) state C25 is continued. The parallel parking (left side, the second half) state C25 corresponds to the scenes of FIG. 7D and FIG. 7E in the sequence of FIG. 7A to FIG. 7E. In the parallel parking (left side, the second half) state C25, it is presumed that the vehicle 41 is driving backwards towards the rear end of the parking bay 80 with the wheel steered to the right such that the vehicle 41 becomes parallel with the parking bay 80.

Figure 7A:
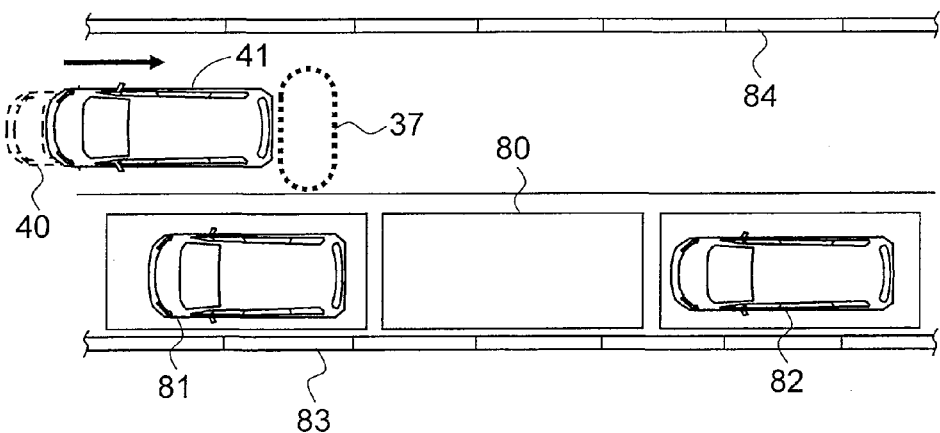
FIG. 7A is a diagram showing a driving state transition in parallel parking (left side).
Figure 7B:
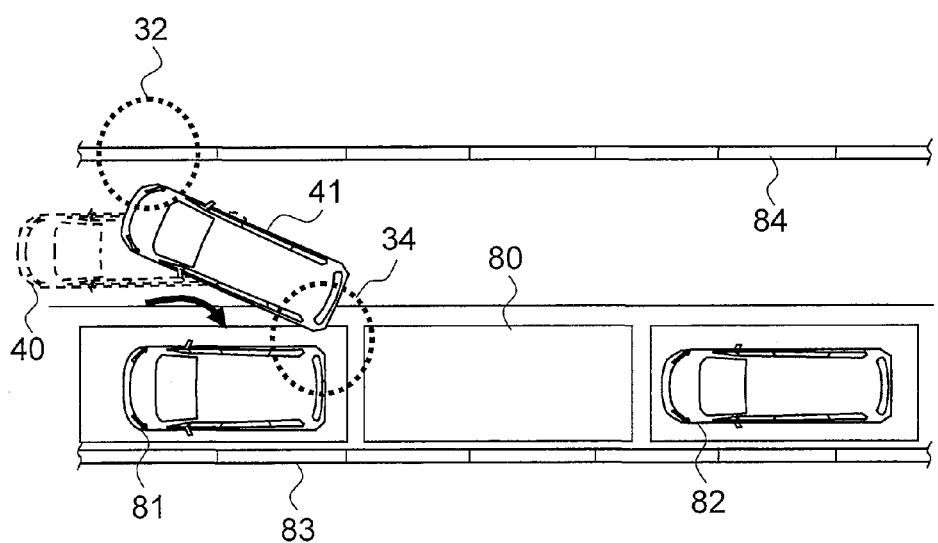
FIG. 7B is a diagram showing a driving state transition in parallel parking (left side).
Figure 7C:
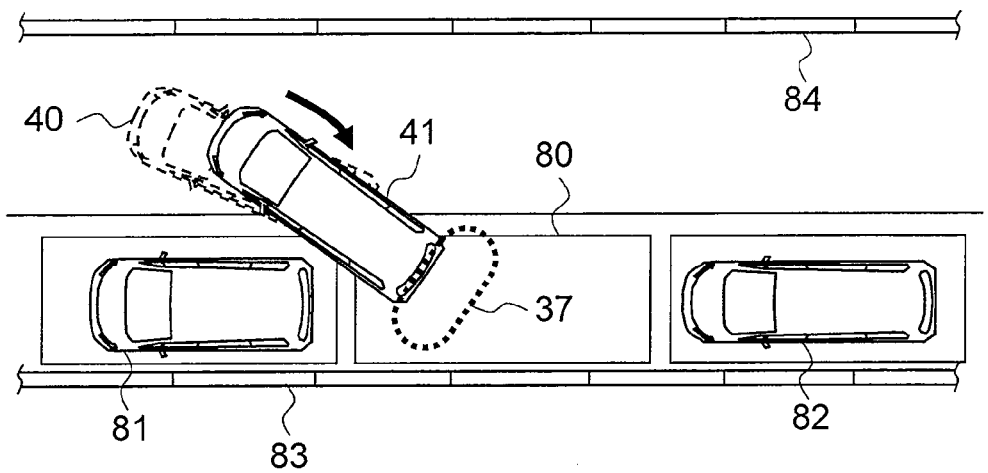
FIG. 7C is a diagram showing a driving state transition in parallel parking (left side).
Figure 7D:
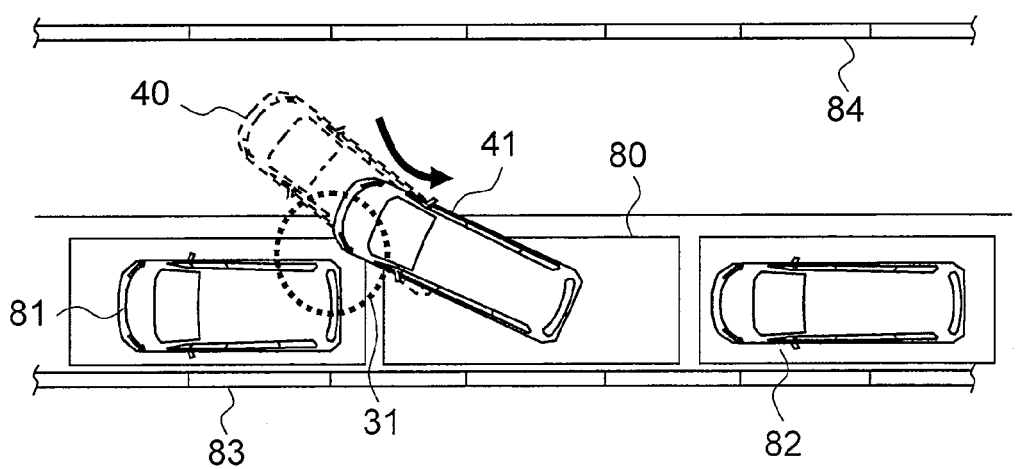
FIG. 7D is a diagram showing a driving state transition in parallel parking (left side).
Figure 7E:
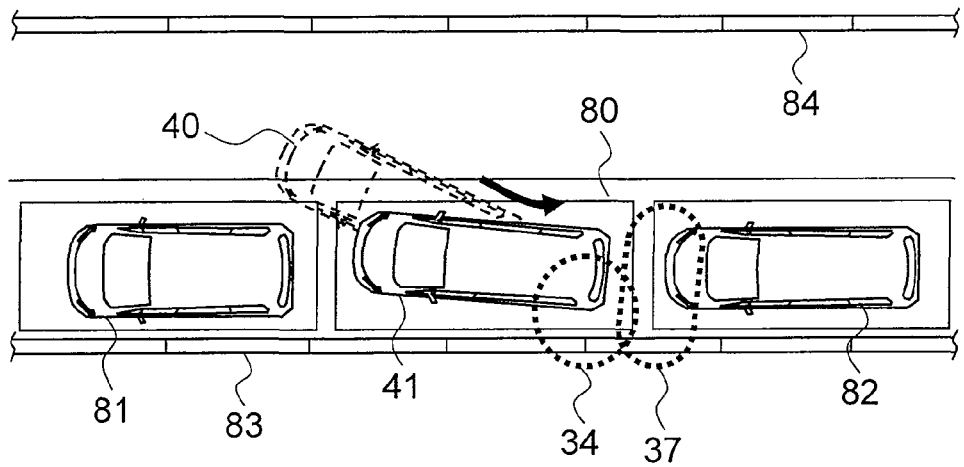
FIG. 7E is a diagram showing a driving state transition in parallel parking (left side).

The scene of FIG. 7D is a scene in which the vehicle 41 starts to steer to the right from the scene of FIG. 7C. Thus, the left front part 31 of the vehicle 41 may hit the vehicle 81. The scene of FIG. 7E is a scene in which the reverse driving is continued from the scene of FIG. 7D to reverse the vehicle 41 towards the rear end of the parking bay 80. Thus, the left rear part 34 of the vehicle 41 may hit the curb 83, and the rear part 37 of the vehicle 41 may also hit the vehicle 82. As the hit of the vehicle 41 against the vehicle 82 and the hit of the vehicle 41 against the curb 83 can result in a collision accident and damage to the vehicle 41, the driver should carefully maneuver the vehicle.

In the parallel parking (left side, the second half) state C25 in the state transition diagram of FIG. 6, when the vehicle 41 has stopped or when the gear is changed from reverse to forward, it is presumed that the vehicle 41 has been successfully parked in the parking bay 80 or the vehicle 41 is about to once move forward with a driver's reattempt to park the vehicle 41 into the parking bay 80, whereby the driving state in parallel parking is determined to have ended. Accordingly, the vehicle state goes back to the initial state C21.

Figure 8:
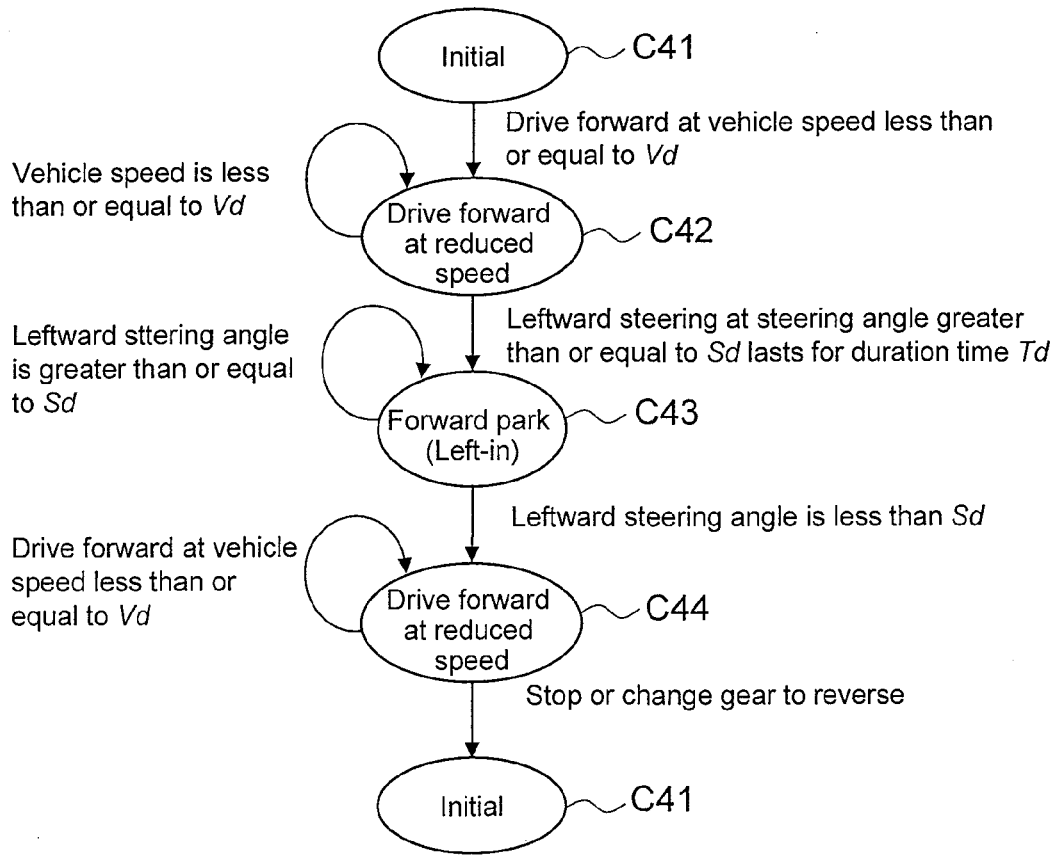
FIG. 8 is a state transition diagram for estimating a driving state in forward parking.

Described next with reference to FIG. 8 and FIGS. 9A to 9E as an example of estimating a driving state is a method for estimating a driving state in forward parking. FIG. 8 is a state transition diagram for estimating a sequence of the driving states in and before/after forward parking (left-in) in which a vehicle is moved forward to be parked into a parking bay located left ahead of the vehicle.

FIG. 9A to FIG. 9E show an exemplary sequence of the driving states in and before/after forward parking (left-in). Reference numeral 90 denotes a parking bay in which the vehicle 41 is to be parked, reference numerals 91 and 92 denote vehicles parked on the opposite sides of the parking bay, and reference numeral 93 denotes a wall.

The driving state estimation unit 2 constantly keeps determining a state transition based on the time series of vehicle signals acquired with the vehicle signal acquisition unit 1, from the time the engine of the vehicle 41 is started till it is stopped. In the state transition diagram of FIG. 8, the vehicle is initially in an initial state C41.

In the state transition diagram of FIG. 8, when it is determined from a vehicle signal of the vehicle signal acquisition unit 1 that the vehicle 41 is driving forward and the vehicle speed V is less than or equal to a vehicle speed Vd, the vehicle state transitions from the initial state C41 to a reduced-speed forward driving state C42. The reduced-speed forward driving state C42 corresponds to the scene of FIG. 9A in the sequence of the driving states in and before/after forward parking (left-in) shown in FIG. 9A to FIG. 9E.

The vehicle speed Vd is the threshold set in advance. The vehicle speed Vd is set at a speed at which the vehicle 41 can be regarded as being forward parked while the driver carefully watches the surrounding. In the reduced-speed forward driving state C42, it is presumed that the driver is determining the timing of when to start steering while recognizing the positional relationship between the parking bay 90 and the vehicle 41. In the reduced-speed forward driving state C42, the vehicle 41 moves substantially straight ahead. Thus, the front part 35 of the vehicle 41 may hit a nearby object.

After the vehicle has entered the reduced-speed forward driving state C42 in the state transition diagram of FIG. 8, when the forward driving at a leftward steering angle greater than or equal to a steering angle Sd has lasted for a time duration greater than or equal to Td, the vehicle state transitions from the reduced-speed forward driving state C42 to a forward parking (left-in) state C43.

While the steering angle is continuously leftward and is greater than or equal to the steering angle Sd, the forward parking (left-in) state C43 is continued. In the sequence of the driving states in and before/after forward parking (left-in) shown in of FIGS. 9A to 9E, the forward parking (left-in) state C43 corresponds to the scenes of FIG. 9B and FIG. 9C. It should be noted that the steering angle Sd and the time duration Td are the thresholds set in advance. The steering angle Sd is set large to a certain extent, i.e., a steering angle required to swing the front part 35 of the vehicle 41 into the parking bay 90 in forward parking. The length of the time duration Td is set long enough to determine that the driver is steering the vehicle for forward parking, not adjusting the steering instantaneously.

In the forward parking (left-in) state C43, it is presumed that the vehicle 41 is being parked into the parking bay 90 from the side of the front part 35 with a swing of the vehicle 41 to the left. The scene of FIG. 9B corresponds to the timing of when the left front part 31 of the vehicle 41 is about to enter the parking bay 90. Thus, the left front part 31 of the vehicle 41 may hit the vehicle 92.

Figure 9A:
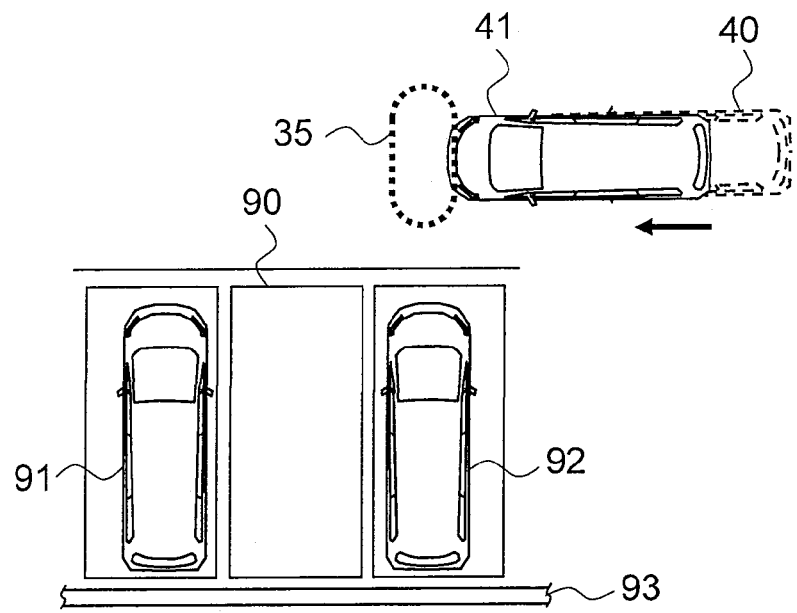
FIG. 9A is a diagram showing a driving state transition in forward parking.
Figure 9B:
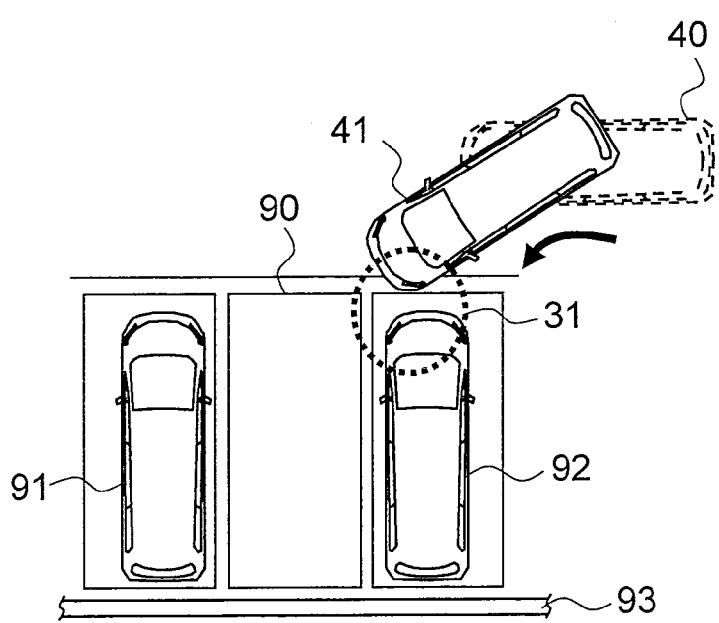
FIG. 9B is a diagram showing a driving state transition in forward parking.
Figure 9C:
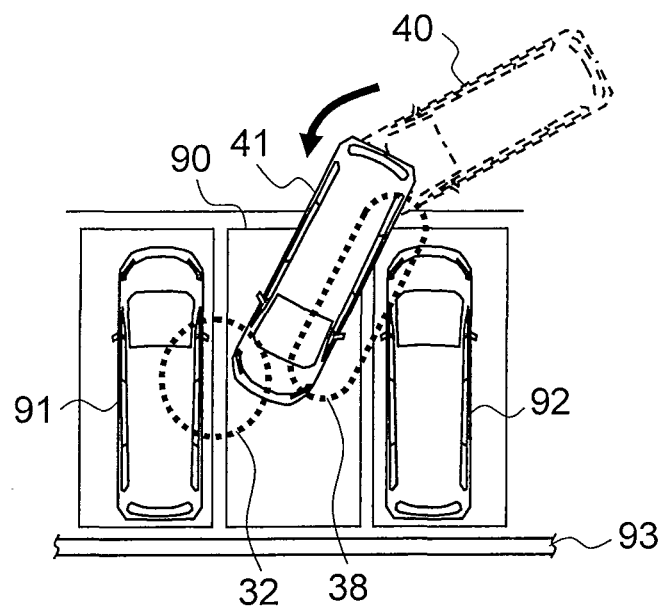
FIG. 9C is a diagram showing a driving state transition in forward parking.

The scene of FIG. 9C corresponds to a scene in which the vehicle 41 is advancing towards the rear end of the parking bay 90 from the scene of FIG. 9B. Thus, the right front part 32 of the vehicle 41 may hit the vehicle 91, and the left part 38 of the vehicle 41 may also hit the vehicle 92.

It should be noted that in forward parking, the rear part of the vehicle travels the inner side of a swing than does the front part of the vehicle due to the inner wheel difference. Thus, even when the left front part 31 does not hit the vehicle 92 in FIG. 9B, the left part 38 may hit the vehicle 92 in the scene of FIG. 9C.

Figure 10:
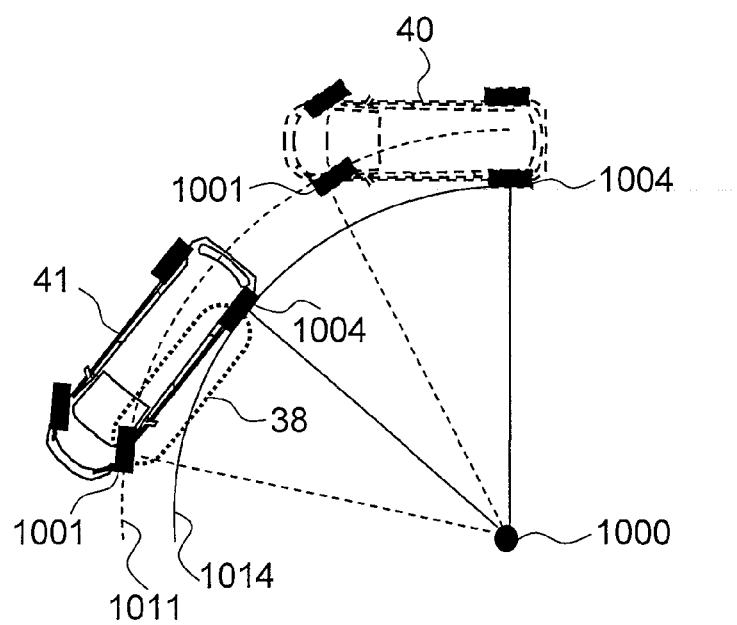
FIG. 10 is a diagram illustrating the inner wheel difference of a vehicle.

FIG. 10 is a diagram illustrating the inner wheel difference of a vehicle. In FIG. 10, reference numeral 1000 denotes the center of a swing, reference numerals 1001 and 1004 denote the left front and left rear tires, respectively, of the vehicle 41, and reference numerals 1011 and 1014 denote swing arcs (trajectories) of the left front tire 1001 and the left rear tire 1004, respectively, of the vehicle 41.

In typical automobiles, the swing arc 1014 of the left rear tire 1004 whose direction in relation to the vehicle 41 does not change by a vehicle maneuver has a smaller radius than the swing arc 1011 of the left front tire 1001 that is controlled to point to the left by a vehicle maneuver. That is the inner wheel difference. Due to the inner wheel difference, the rear part of the left side of the vehicle 41 is located closer to the center 1000 of a swing than is the front side. In FIG. 9C, the rear of the left part 38 of the vehicle 41 is located closer to the center of a swing than is the front of the left part 38 due to the inner wheel difference. Thus, as the rear of the left part 38 of the vehicle 41 approaches closer to the vehicle 92 than does the front of the left part 38 in the scene of FIG. 9C due to the inner wheel difference, the driver should carefully maneuver so that the vehicle 41 will not hit the vehicle 92.

In the forward parking (left-in) state C43 in the state transition diagram of FIG. 8, when the leftward steering angle has become smaller than the steering angle Sd, the vehicle state transitions to a reduced-speed forward driving state C44. After the vehicle state has transitioned from the forward parking (left-in) state C43 to the reduced-speed forward driving state C44, the reduced-speed forward driving state C44 is continued as long as the vehicle 41 keeps moving forward at a vehicle speed less than or equal to Vd.

In the reduced-speed forward driving state C44, it is presumed that the vehicle 41 is advancing deeper into the parking bay 90 after the vehicle 41 is positioned substantially parallel with the parking bay 90 with the driver's turn of the steering wheel at a large steering angle. The reduced-speed forward driving state C44 corresponds to the scenes of FIG. 9D and FIG. 9E in the exemplary sequence of the driving states in and before/after forward parking (left-in) shown in FIGS. 9D and 9E.

Figure 9D:
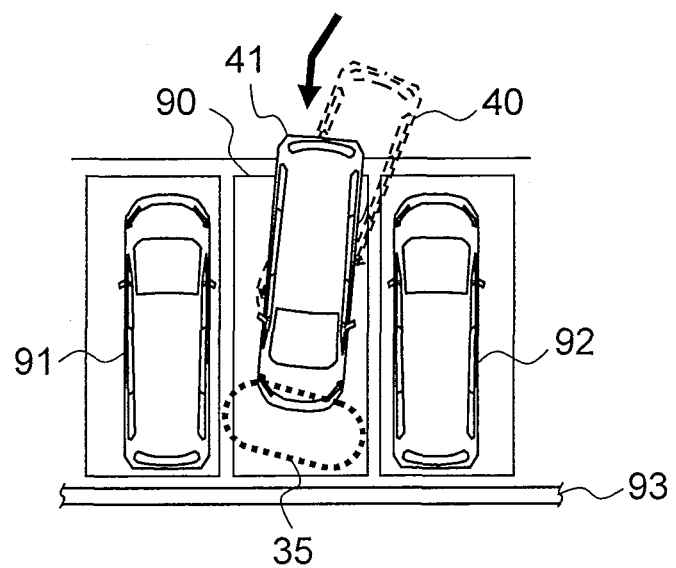
FIG. 9D is a diagram showing a driving state transition in forward parking.
Figure 9E:
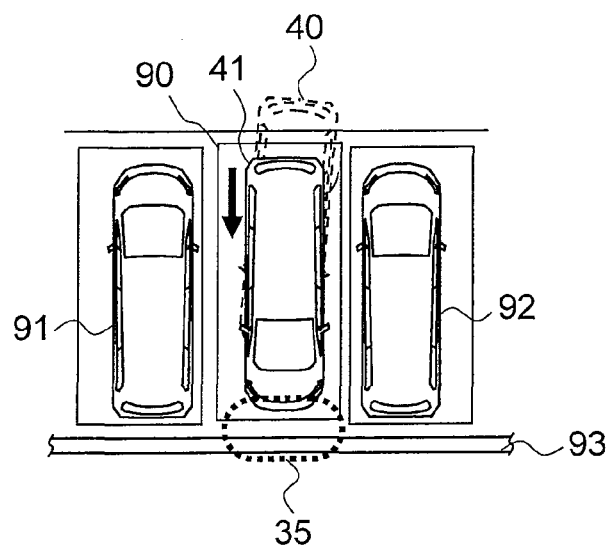
FIG. 9E is a diagram showing a driving state transition in forward parking.

FIG. 9D is a scene in which the vehicle 41 is advancing towards the rear end of the parking bay 90 with the steering turned back after the scene of FIG. 9C. FIG. 9D shows a scene in which, after the vehicle 41 is positioned substantially parallel with the parking bay 90 after the scene of FIG. 9C, the vehicle stop position is adjusted so that the front part 35 of the vehicle 41 is positioned around the rear end of the parking bay 90. In the scenes of FIG. 9D and FIG. 9E, the vehicle 41 moves substantially straight ahead. Thus, the front part 35 of the vehicle 41 may hit the wall 93 located at the rear end of the parking bay 90.

In the reduced-speed forward driving state C44 in the state transition diagram of FIG. 8, when the vehicle 41 has stopped or when the gear of the vehicle 41 is changed from forward to reverse, it is presumed that the vehicle 41 has been successfully parked into the parking bay 90 or the vehicle 41 is about to be once moved in reverse with a driver's reattempt to park the vehicle 41 into the parking bay 90, whereby the driving state in forward parking (left-in) is determined to have ended. Accordingly, the vehicle state goes back to the initial state C41.

It should be noted that in the state transition process shown in each of the state transition diagrams of FIG. 2, FIG. 4, FIG. 6, and FIG. 8, when a vehicle signal of the vehicle signal acquisition unit 1 indicates that the same state is continuing or the state transition conditions are not satisfied, the vehicle state transitions to the initial state C11, C21, C31, or C41 so that the state transition is reset.

The driving state estimation unit 2 repeats estimation of a state transition in at least one driving state sequence registered in advance such as a state transition in the sequence of the driving states in and before/after perpendicular parking (left-in) shown in FIG. 2, a state transition in the sequence of the driving states in and before/after driving past an oncoming vehicle (pulling to the left) shown in FIG. 4, a state transition in the sequence of the driving states in and before/after parallel parking (left side, the first half) and parallel parking (left side, the second half) shown in FIG. 6, or a state transition in the sequence of the driving states in and before/after forward parking (left-in) shown in FIG. 8, from the time the engine of the vehicle is turned on till it is turned off, in a predetermined time cycle based on the input of a vehicle signal of the vehicle signal acquisition unit 1.

It should be noted that the sequence of the driving states registered in the driving state estimation unit 2 is not limited to perpendicular parking (left-in reverse parking) shown in FIG. 2, passing an oncoming vehicle (pulling to the left) shown in FIG. 4, parallel parking shown in FIG. 6, and forward parking shown in FIG. 8. That is, any driving state that can be estimated from times series of vehicle signals can be registered. It should also be noted that when state transitions in two or more driving state sequences are registered in the driving state estimation unit 2, the state transitions in the individual driving state sequences are independently estimated. The driving state estimation unit 2 outputs the estimated driving state to the collision-warned part selection unit 3.

The collision-warned part selection 3, in accordance with the driving state estimated with the driving state estimation unit 2, refers to a reference table set in advance to determine a part of the vehicle 41 that has a possibility of hitting a nearby object, and outputs the signal as a collision-warned part. The reference table is stored in storage means (not shown) such as ROM or RAM of the computer.

FIG. 11 shows a reference table of parts that have a possibility of hitting a nearby object in accordance with the driving state, which is referred to by the collision-warned part selection unit 3. FIG. 12 shows an exemplary list of candidate parts that can be the collision-warned parts of the vehicle 41. In FIG. 12, reference numerals 31, 32, 33, and 34 denote the left front part, right front part, right rear part, and left rear part, respectively, of the vehicle 41, and reference numerals 35, 36, 37, and 38 denote the front part, right part, rear part, and left part, respectively, of the vehicle 41.

For example, when the driving state is the reverse state, the rear part 37 of the vehicle 41 may hit a nearby object as shown in the exemplary scenes of FIG. 3A, FIG. 3D, and FIG. 3. Thus, the rear part 37 is defined as the collision-warned part from among the plurality of candidate parts shown in FIG. 12.

When the driving state is the perpendicular parking (left-in reverse parking) state, the right front part 32 or the left rear part 34 may hit a nearby object as shown in the exemplary scene of FIG. 3B or the right rear part 33, in particular, may hit a nearby object as shown in the exemplary scene of FIG. 3C. Thus, the three parts including the right front part 32, the right rear part 33, and the left rear part 34 are defined as the collision-warned parts.

When the driving state is the state of driving past an oncoming vehicle (pulling to the left), the left front part 31 may hit a nearby object as shown in the exemplary scene of FIG. 5B, and the right part 36 and the left part 38 may also hit the oncoming vehicle or a nearby object as shown in the exemplary scene of FIG. 5C. Thus, the left front part 31, the right part 36, and the left part 38 are defined as the collision-warned parts.

When the driving state is the parallel parking (left side, the first half) state, the right front part 32 or the left rear part 34 may hit a nearby object or another vehicle as shown in the exemplary scene of FIG. 7B. Thus, the two parts including the right front part 32 and the left rear part 34 are defined as the collision-warned parts.

When the driving state is the parallel parking (left side, the second half) state, the left front part 31, the left rear part 34, or the rear part 37 may hit another vehicle or nearby object as shown in the exemplary scenes of FIG. 7D and FIG. 7E. Thus, the three parts including the left front part 31, the left rear part 34, and the rear part 37 are defined as the collision-warned parts.

When the driving state is the reduced-speed forward driving state, the front part 35 may hit a nearby object as shown in the exemplary scenes of FIG. 9A, FIG. 9D, and FIG. 9E. Thus, only the front part 35 is defined as the collision-warned part.

When the driving state is the forward parking (left-in) state, the left front part 31, the right front part 32, or the left part 38 may hit another vehicle or a nearby object as shown in the exemplary scenes of FIG. 9B and FIG. 9C. Thus, the three parts including the left front part 31, the right front part 32, and the left part 38 are defined as the collision-warned parts.

The image acquisition unit 4 acquires images captured with the cameras installed on the vehicle 41. FIG. 13 shows examples of the cameras installed on the vehicle 41. Reference numerals 51, 52, 53, and 53 denote cameras on the front part, right part, rear part, and left part, respectively.

Each of the cameras 51 to 54 is a wide-angle camera installed such that it can capture an image of the peripheral area of the front part 35, the right part 36, the rear part 37, or the left part 38 of the vehicle 41 within the angle of view. Further, one or both of the camera 51 on the front part and the camera 54 on the left part is/are installed such that the camera (s) can capture an image of the peripheral area of the left front part 31 of the vehicle 41 within the angle of view.

Similarly, one or both of the camera 51 on the front part and the camera 52 on the right part, one or both of the camera 52 on the right part and the camera 53 on the rear part, and one or both of the camera 53 on the rear part and the camera 54 on the left part are installed such that the cameras can capture images of the peripheral areas of the right front part 32, the right rear part 33, and the left rear part 34 of the vehicle 41, respectively.

The periphery image generation unit 5 generates an image of the peripheral area of the vehicle 41 (vehicle periphery image) in a predetermined time cycle from the images acquired with the image acquisition unit 4. The periphery image generation unit 5 processes the images captured with the cameras 51, 52, 53, and 54 on the front part, right part, rear part, and left part of the vehicle 41 to generate a top-view image through a viewpoint conversion process such that the resulting image appears to be viewed from a virtual viewpoint above the vehicle 41 with the ground around the vehicle 41 as a reference. For geometric data needed for the viewpoint conversion process, data calculated in advance is used.

The enlarged image generation unit 6 processes the image acquired with the image acquisition unit 4 to generate an enlarged image of the peripheral area of a specific part of the vehicle 41 in accordance with the collision-warned part, which has a possibility of hitting a nearby object, of the vehicle 41 output from the collision-warned part selection unit 3.

FIG. 14 shows an exemplary correspondence table within the enlarged image generation unit 6. Specifically, FIG. 14 shows a list that defines the relationship between a corresponding camera and an area cut out from an image captured with the camera in accordance with a part of the vehicle 41 such as the left front part 31 or the right front part 32.

Figure 15:
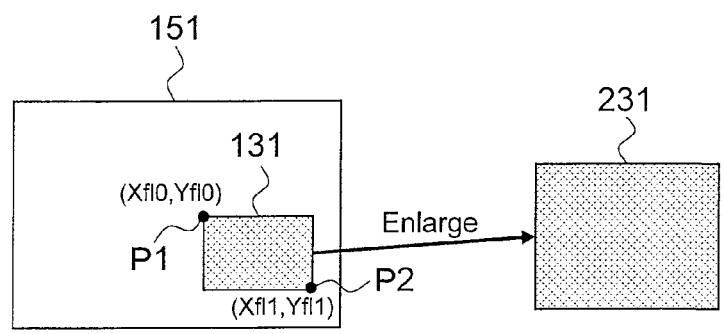
FIG. 15 is a diagram showing an example of a method for generating an enlarged image with an enlarged image generation unit.

FIG. 15 is a diagram illustrating a method for generating an enlarged image with the enlarged image generation unit 6. Reference numeral 151 denotes an image captured with the camera 54 on the left part, reference numeral 131 denotes a rectangular cutout area having two vertices at coordinates P1 (Xf10, Yf10) and coordinates P2 (Xf11, Yf11). Reference numeral 231 denotes an enlarged image formed by enlarging the cutout area 131.

When the collision-warned part selection unit 3 has output the left front part 31 as the collision-warned part, the enlarged image generation unit 6 generates, with reference to the correspondence table of FIG. 14, the enlarged image 231 by cutting the cutout area 131 out of the image 151 shown in FIG. 15 captured with the camera 54 on the left part and enlarging it.

It should be noted that the correspondence table of FIG. 14 is only exemplary and thus can be set such that the correspondence between the collision-warned part of the vehicle 41 and the camera differs from that shown in FIG. 14. For example, when the camera 51 on the front part captures an image of the peripheral area of the left front part 31 within the angle of view, the camera 51 on the front part can be used as a camera corresponding to the left front part 31. Alternatively, when a plurality of cameras capture images of a part of the vehicle 41, images captured with two cameras can be combined for display such that the resulting image appears to be viewed from a virtual viewpoint.

The composite display image generation unit 7 generates a composite display image composed of an image of the peripheral area of the vehicle generated by the periphery image generation unit 5 and an enlarged image of the peripheral area of a specific part of the vehicle 41 generated by the enlarged image generation unit 6.

Figure 16:
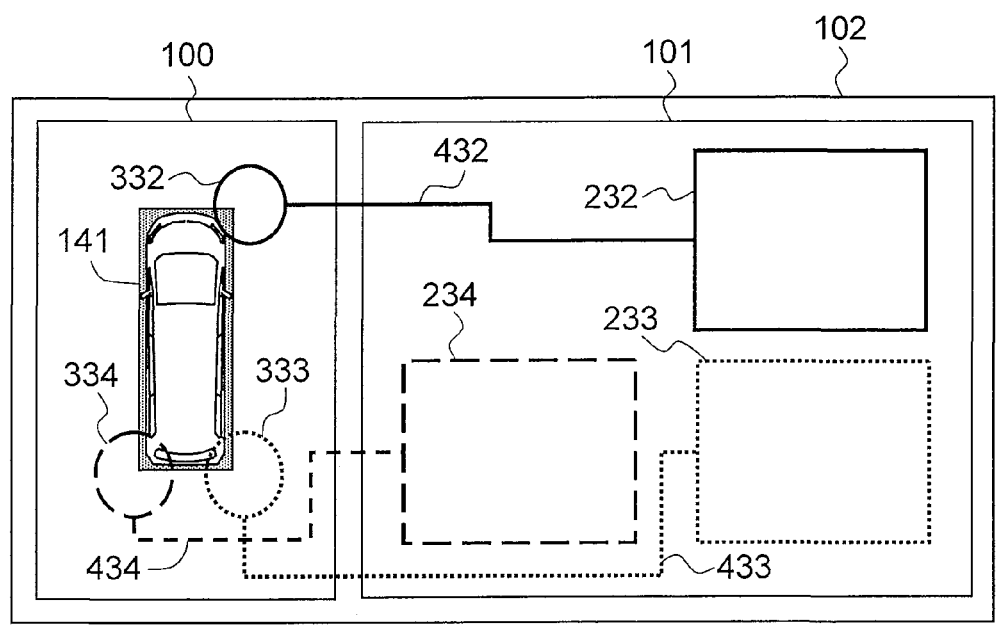
FIG. 16 is an example of a composite display image generated by a composite display image generation unit.

FIG. 16 schematically shows an example of a composite display image generated by the composite display image generation unit. A composite display image 102 shown in FIG. 16 is a composite display image generated with a single layout in the conditions that the collision-warned part selection unit 3 has outputted the right front part 32, the right rear part 33, and the left rear part 34 of the vehicle 41 as the collision-warned parts.

In FIG. 16, reference numeral 100 denotes an image (top-view image) of the peripheral area of the vehicle 41 generated by the periphery image generation unit 5, reference numeral 101 denotes a display space arranged next to the vehicle periphery image 100, reference numeral 141 denotes an icon of the vehicle 41 displayed on the vehicle periphery image 100, and reference numerals 332, 333, and 334 denote markers indicating the right front part 32, the right rear part 33, and the left rear part 34, respectively. Reference numerals 232, 233, and 234 denote enlarged images of the peripheral areas of the right front part 32, the right rear part 33, and the left rear part 34, respectively, which are generated by the enlarged image generation unit 6. Reference numerals 432, 433, and 434 are connecting lines that connect the markers 332, 333, and 334 to the enlarged images 232, 233, and 234, respectively.

The composite display image 102 is displayed in a form in which the positions of the vehicle periphery image 100 and the enlarged images 232, 233, and 234 are correlated with each other. Specifically, the composite display image 102 is displayed such that the peripheral areas of the collision-warned parts of the vehicle 41 are displayed in detail, and the markers 332, 333, and 334 on the vehicle periphery image 100 are linked to the enlarged images 232, 233, and 234 shown on the display space 101 so that the driver can recognize at a glance the correspondence relationship between the enlarged images 232, 233, and 234 and the corresponding parts of the vehicle 41.

It should be noted that the composite display image generation unit 7 can be configured to, instead of depicting the connecting lines 432, 433, and 434, correlate the enlarged images 232, 233, and 234 and the corresponding parts of the vehicle 41 by unifying the design (e.g. the color or the kind of line) of the markers 332, 333, and 334 and the design (the color of the outer frame or the kind of line) of the corresponding enlarged images 232, 233, and 234.

The composite display image generation unit 7 can also be configured to perform a process such as rotation or inversion so that the top and bottom edges or the right and left edges of the enlarged image 234 or the like coincide with those of the vehicle periphery image 100. Furthermore, the composite display image generation unit 7 can also be configured to perform a process such as viewpoint conversion by which the viewpoint of the enlarged image 232 or the like is converted into a virtual viewpoint of the vehicle periphery image 100 or a virtual viewpoint that is close to the virtual viewpoint of the vehicle periphery image 100 so that the enlarged image 232 or the like looks the same way as the vehicle periphery image 100 does.

Figure 17A:
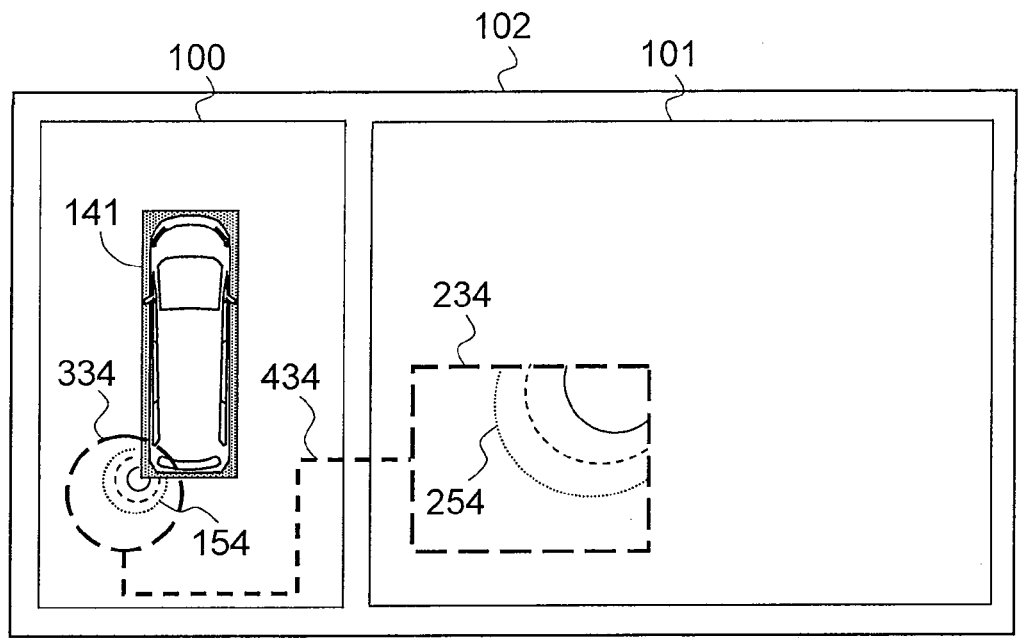
FIG. 17A is a diagram showing another example of a composite display image generated by the composite display image generation unit.
Figure 17B:
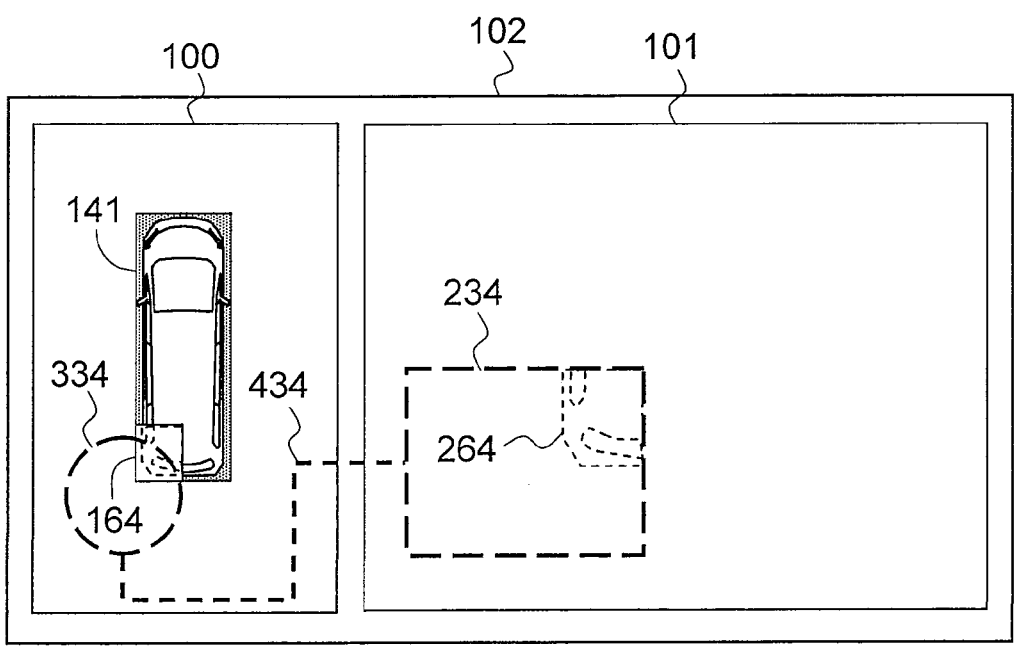
FIG. 17B is a diagram showing still another example of a composite display image generated by the composite display image generation unit.

FIG. 17A and FIG. 17B are diagrams showing other examples of the composite display image generated by the composite display image generation unit 7. FIG. 17A shows an example of a composite display image in the case in which the rear left part 34 of the vehicle 41 is enlarged for display. In FIG. 17A, reference numeral 154 denotes arcuate guide lines depicted with the left rear part of the icon 141 of the vehicle 41 on the vehicle periphery image 100 as the center. The guide lines 154 are depicted in plural in a manner radially equidistant from each other. The guide lines 154 are depicted such that the kind of line differs according to the distance from the vehicle 41.

Reference numeral 254 denotes elliptical guide lines on the enlarged image 234 depicted in positions at about the same distance from the vehicle 41 as the substantially concentric guide lines 154. The number of the guide lines 154 on the vehicle periphery image 100 and the number of the guide lines 254 on the enlarged image 234 are the same, and the kind or color of the corresponding lines are also the same.

On the composite display image 102 of FIG. 17A, the distance from the vehicle 41 is shown with the guide lines 154 on the vehicle periphery image 100 and with the guide lines 254 on the enlarged image 234, whereby the sense of distance between a nearby object on the enlarged image 234 and the vehicle 41 can be expressed. In addition, on the composite display image 102 of FIG. 17A, the driver can recognize at a glance which direction of the vehicle periphery image 100 corresponds to the upward direction of the enlarged image 234.

It should be noted that the number of the guide lines 154 on the vehicle periphery image 100 and the number of the guide lines 254 on the enlarged image 234 in FIG. 17A can be more than three as shown. In addition, all of the individual circles or ellipses of the guide lines 154 on the vehicle periphery image 100 or the guide lines 254 on the enlarged image 234 can be depicted with the same kind of line or color to provide a simple depiction. Further, as which part of the vehicle periphery image 100 corresponds to the enlarged image 234 can be clearly seen from the guide lines 154 on the vehicle periphery image 100 and the guide lines 254 on the enlarged image 234 shown in FIG. 17A, the depictions of the marker 334 and the connecting line 434 can be omitted.

FIG. 17B shows another example of the composite display image 102 formed through a composite process with the composite display image generation unit 7. As in FIG. 17A, FIG. 17B shows an example of a composite display image in the case in which the left rear part 34 of the vehicle 41 is enlarged for display.

In FIG. 17B, reference numeral 164 denotes a semi-transparent image in which the left rear part of the icon 141 of the vehicle 41 on the vehicle periphery image 100 is semi-transparent. Reference numeral 264 denotes a semi-transparent image on the enlarged image 234 that schematically shows a part of the vehicle 41 corresponding to the semi-transparent portion 164 of the icon 141.

On the composite display image 102 shown in FIG. 17B, which part of the vehicle 41 corresponds to the enlarged image 234 can be displayed in a correlated manner with the semi-transparent portion 164 of the icon 141 and the semi-transparent image 264 of the vehicle 41.

Further, on the composite display image 102 shown in FIG. 17B, the driver can recognize at a glance which direction of the vehicle periphery image 100 corresponds to the upward direction of the enlarged image 234 by viewing the directions of the semi-transparent portion 164 of the icon 141 and the semi-transparent image 264 of the vehicle 41.

The semi-transparent image 264 of the vehicle 41 shown in FIG. 17B is depicted such that it is viewed from right above the vehicle 41 as with the semi-transparent portion 164 of the icon 141. However, if the enlarged image 234 is not a top-view image, the semi-transparent image 264 can be depicted as a stereoscopic image viewed obliquely from above the vehicle 41.

Further, as which part of the vehicle periphery image 100 corresponds to the enlarged image 234 can be clearly seen from the semi-transparent portion 164 of the icon 141 and the semi-transparent image 264 of the vehicle 41 shown in FIG. 17B, the depictions of the marker 334 and the connecting line 434 can be omitted.

The guide lines 154 and the guide lines 254 shown in FIG. 17A and the semi-transparent portion 164 of the icon 141 and the semi-transparent image 264 of the vehicle 41 shown in FIG. 17B can be concurrently depicted on the same monitor.

The composite display image generation unit 7 reads images from the periphery image generation unit 5 and from the enlarged image generation unit 6 in a predetermined operation cycle to update the displayed image. Further, the composite display image generation unit 7 updates the layout of the composite display image each time the driving state estimated by the driving state estimation unit 2 changes and the collision-warned part selection 3 changes the collision-warned part that has a possibility of hitting a nearby object.

It should be noted that in the composite display image generation unit 7, the layouts of the vehicle periphery image 100 and the display space 101 are not limited to the examples shown in FIGS. 16, 17A, and 17B. Thus, other layouts can be used, for example, such that the display space 101 is located on the right side of the vehicle periphery image 100.

The display space 101 can be configured to always display any image while it does not display the enlarged images 232, 233, 234, and the like. For example, the display space 101 can be configured to always display an image captured with the camera 53 on the rear part or a screen of a car navigation system and display an enlarged image only when the vehicle is in a given driving state.

The display unit 8 displays for the driver the composite display image 102 formed through a composite process by the composite display image generation unit 7. It should be noted that the display unit 8 may have two or more screens. For example, the vehicle periphery image 100 can be output to a car navigation screen and the enlarged image 232 or the like can be displayed on the side of a vehicle speed mater on a liquid crystal display.

In Embodiment 1, a collision-warned part of the vehicle 41 that has a possibility of hitting a nearby object is estimated in accordance with the driving state of the vehicle 41 with the aforementioned functional configuration. Then, an enlarged image of the peripheral area of the collision-warned part, a marker indicating the collision-warned part on the image of the peripheral area of the vehicle 41, a connecting line that indicates the correspondence relationship between the marker of the peripheral area of the vehicle 41 and the enlarged image, and the like are depicted.

Therefore, the composite display image 102 can be automatically displayed at an appropriate timing while the vehicle is driving such that the driver can recognize at a glance the detailed enlarged image 232 or the like of the peripheral area of the collision-warned part as well as the positional relationship between the enlarged image 232 or the like and the vehicle 41.

When the aforementioned in-vehicle image display device according to Embodiment 1 is compared with the technique of Reference 1 in which a displayed camera image is switched based on the vehicle traveling direction as a reference, it would be difficult, in the scene shown in FIG. 3B, for example, for the driver to check the possibility of if the right front part 32 of the vehicle 41 may hit a nearby structure as the vehicle 41 drives in reverse and the right front part 32 of the vehicle 41 on the opposite side is not displayed.

In contrast, with the in-vehicle image display device according to Embodiment 1, both the right rear part 33 and the left rear part 34 in the travelling direction of the vehicle 41 and the right front part 32 of the vehicle 41 on the opposite side are enlarged for display based on the estimation of the driving state in perpendicular parking (left-in reverse parking) with the driving state estimation unit 2 in the scene of FIG. 3B. Thus, the driver can easily check the possibility of if the right front part 32 of the vehicle 41 may hit a nearby object.

It should be noted that although FIG. 13 shows an example of the installation of cameras on the vehicle 41 along with the description of Embodiment 1, the number and positions of cameras installed on the vehicle 41 according to the present invention can be other than those shown in FIG. 8 in which four cameras are installed on the front part, right part, rear part, and left part like the cameras 51, 52, 53, and 54.

For example, when a single wide-angle camera that can capture an image of the peripheral areas of the right rear part 33, the rear part 37, and the left rear part 34 is installed on the rear part of the vehicle 41, and the collision-warned part selection unit 3 designates the right rear part 33, the rear part 37, or the left rear part 34 as the collision-warned parts in accordance with the driving state estimated with the driving state estimation unit 2, it is acceptable as long as the enlarged image of the right rear part 33, the rear part 37, or the left rear part 34 is combined with the vehicle periphery image 100 for display on the display space 101 as shown in FIG. 16.

It should be noted that when there exists a blind spot with the cameras installed on the vehicle 41 being unable to capture images of the entire peripheral area of the vehicle 41, and the collision-warned part selection unit 3 designates the portion of the blind spot as the collision-warned part, the enlarged image generation unit 6 and the composite display image generation unit 7 exclude the generation of enlarged images and composite display image, respectively (do not generate such images). Alternatively, when there exists a blind spot with the cameras installed on the vehicle 41 being unable to capture images of the entire peripheral area of the vehicle 41, the periphery image generation unit 5 blanks the portion of the blind spot on the vehicle periphery image 100.

In the description of Embodiment 1, a top-view image formed from images captured with the cameras 51, 52, 53, and 54 on the front part, right part, rear part, and left part is used as the vehicle periphery image 100 generated by the periphery image generation unit 5. However, the periphery image generation unit 5 can be configured to generate as the vehicle periphery image 100 an image other than the top-view image as long as such an image allows the peripheral area of the vehicle 41 to be recognized at a glance when arranged on the periphery of the icon 141 of the vehicle 41.

Figure 18A:
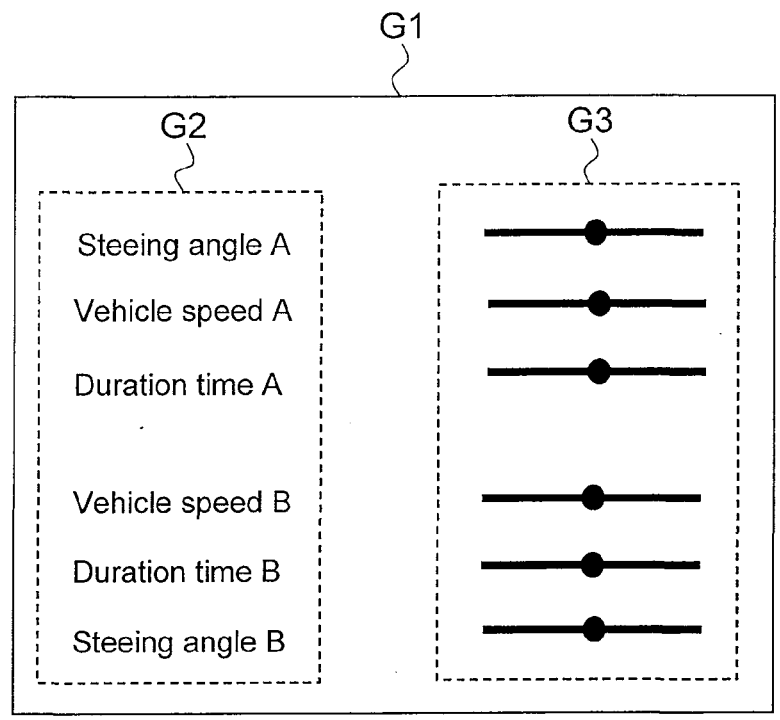
FIG. 18A to 18C are diagrams showing examples of a menu screen displayed on a display unit.

In Embodiment 1, the driving state estimation unit 2 can be configured to have, using a menu screen G1 such as the one shown in FIG. 18A displayed on the display unit 8, a menu function that can be adjusted with the use of a slide bar G3 so that the driver can adjust parameters G2 such as the steering angle Sa and the vehicle speed Va that are used for the estimation of the driving state with the driving state estimation unit 2.

Figure 18B:
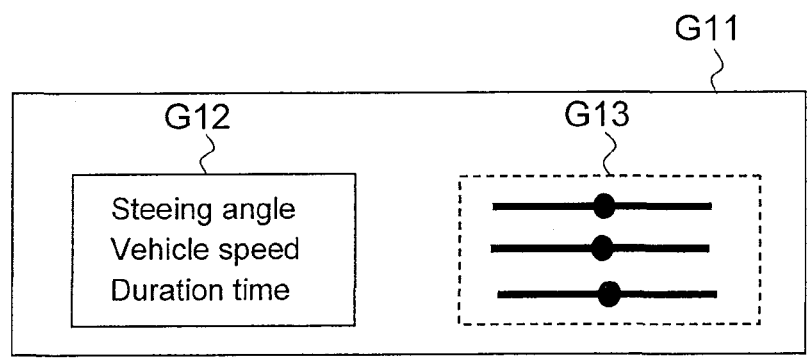

A user interface screen for adjusting the parameters of the driving state estimation unit 2 is not limited to the example of the menu screen G1. For example, as shown in FIG. 18B, parameters G12 can be categorized into several groups such as the steering angle, vehicle speed, and duration time like a menu screen G11, so that the parameters of each group can be adjusted at a constant ratio with a slide bar G13.

Figure 18C:
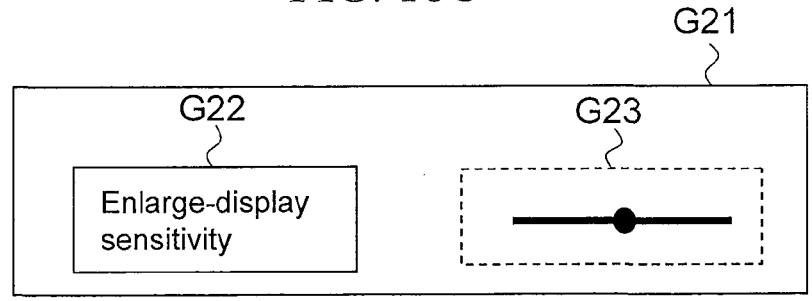

Alternatively, for adjustment of the parameters of the driving state estimation unit 2, all of parameters G22 can be collectively displayed as shown in a menu screen G21 like a user interface screen of FIG. 18C so that each parameter of the driving state estimation unit 2 can be adjusted at a constant ratio with a slide bar G23.

It should be noted that the characters used for the parameters G2, G12, and G22 are only exemplary and other characters can be used. In addition, for the slide bars G3, G13, and G23, other graphical user interfaces such as menu buttons can be used.

The driver can adjust the parameters G2, G12, or G22 of the driving state estimation unit 2 using the menu screen G1, G11, or G21 so that the enlarged image 234 or the like can be displayed at an appropriate timing in accordance with the drive of each driver. The user interface screen G1 of FIG. 18A and the user interface screen G11 of FIG. 18B need not be displayed at all times. For example, display/non-display of the user interface screens can be switched with a switch (not shown) provided in the display unit 8.

[Embodiment 2]

Figure 19:
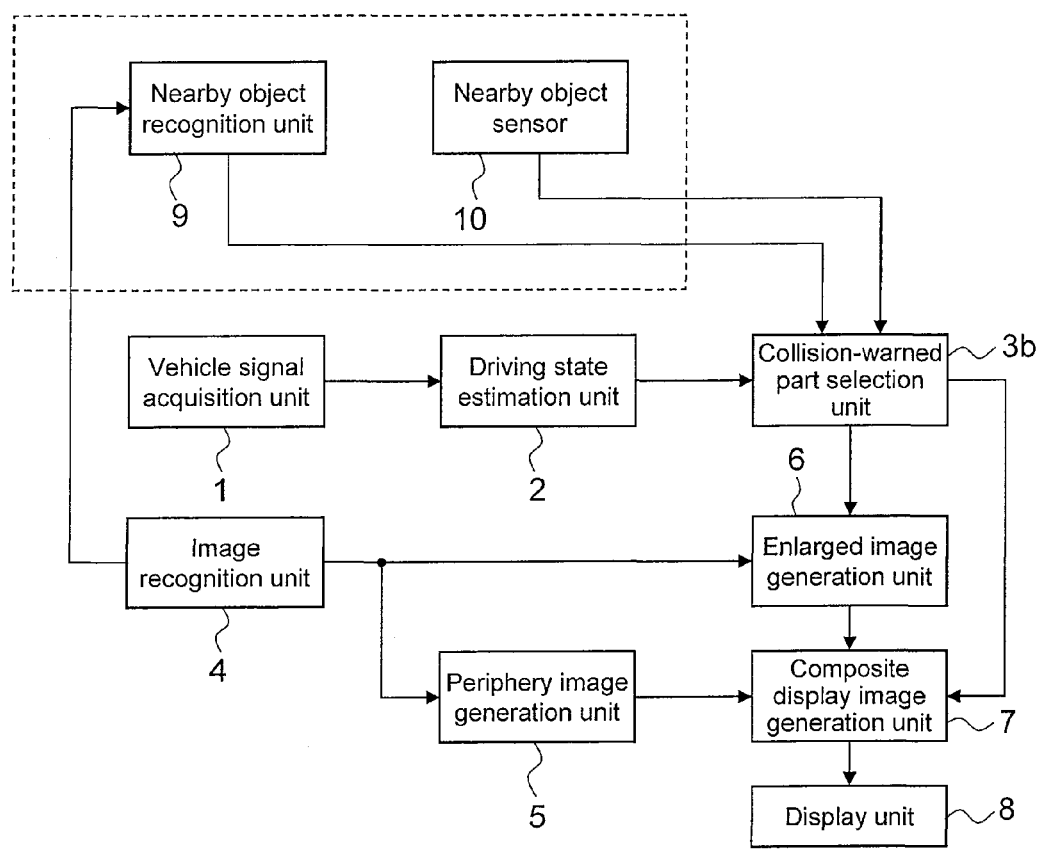
FIG. 19 is a functional block diagram of an in-vehicle image display device in accordance with Embodiment 2.

Next, Embodiment 2 will be described. FIG. 19 is a functional block diagram of an in-vehicle image display device in accordance with Embodiment 2. It should be noted that components that are identical to those of Embodiment 1 are denoted by identical reference numerals, and the detailed description thereof will be omitted.

One or both of a nearby object recognition unit 9 and a nearby object sensor 10 is/are included in the functional configuration of Embodiment 2 and constitute(s) an object detection unit. The nearby object recognition unit 9 receives as an input a camera image acquired with the image acquisition unit 4, and recognizes the kind of an object, for which the possibility of a collision with the vehicle 41 cannot be ignored, out of objects that exist around the vehicle 41 through an image recognition process.

The nearby object recognition unit 9 recognizes stereoscopic objects existing around the vehicle 41 such as the vehicles 45, 61, 62, 81, 82, 91, and 92 around the vehicle 41 or the guard rail 63 as shown in FIG. 3, FIG. 5, FIG. 7, and FIG. 9, for example, with a method for detecting stereoscopic objects using motion parallax along with the movement of the vehicle 41 described in Reference 3 ("Estimation of Depth with Stereocamera Using Monocular Motion Parallax," Akira Iguchi et al., Proceedings 2002 of Information Science and Technology Forum). The nearby object recognition unit 9 recognizes an object such as the gutter 60 or the boundary line of the parking bay 70 with a line extraction method such as Hough transform.

The nearby object recognition unit 9, upon detecting an object around the vehicle 41, identifies if the detected object is located around any of the peripheral areas of the collision-warned parts of the vehicle 41 such as the left front part 31 and the rear part 37 from the positional relationship between the vehicle 41 and the camera installed on the vehicle 41 such as the camera 51 on the front part or the camera 52 on the right part. The nearby object recognition unit 9 outputs to a collision-warned part selection unit 3b information indicating that it has detected a nearby object as well as information about which part of the vehicle 41 the detected object is located close to.

The nearby object sensor 10 recognizes stereoscopic objects existing around the vehicle 41 such as the vehicles 45, 61, and 62 and the guard rail 63 (see FIG. 3, FIG. 5, FIG. 7, and FIG. 9) with the use of a sensor that detects objects existing around the vehicle through laser ranging or ultrasonic ranging.

For a sensor used as the nearby object sensor 10, the positional relationship between the sensor and the vehicle 41, e.g., information about which part of the vehicle 41 the sensor is installed on and which part of the vehicle 41 is to be measured is determined in advance. The nearby object sensor 10, upon detecting a nearby object around the vehicle 41, identifies the direction of the detected object in relation to the vehicle 41 (e.g., the left front part 31 or the left part 37). Then, the nearby object sensor 10 outputs information indicating that it has detected a nearby object as well as information about which part of the vehicle 41 the detected object is located close to.

The collision-warned part selection unit 3b has, in addition to the aforementioned function of the collision-warned part selection unit 3 of Embodiment 1, a function of narrowing the collision-warned parts of the vehicle 41 set in accordance with the driving state down to a part of the vehicle 41 around which the object has been detected with the nearby object recognition unit 9 or the nearby object sensor 10. Specifically, the collision-warned part selection unit 3b performs a process of determining at least one of the collision-warned parts of the vehicle 41 set in accordance with the driving state to be a candidate part that could be the collision-warned part of the vehicle, and selecting as the collision-warned part a candidate part around which the object detected with the object detection unit such as the nearby object sensor 10 is located.

For example, in the scene of FIG. 3C, when the driving state estimated with the driving state estimation unit 2 is the perpendicular parking (left-in reverse parking) state and the nearby object recognition unit 9 has detected a stereoscopic object around the right rear part 33 of the vehicle 41, the collision-warned part selection unit 3b outputs as the collision-warned part of the vehicle 41 only the left rear part 34 from among the right front part 32, the right rear part 33, and the left rear part 34 of the collision-warned parts in accordance with the driving state in perpendicular parking (left-in reverse parking) shown in the reference table of FIG. 11.

Information on the collision-warned part of the vehicle 41 output from the collision-warned part selection unit 3b is reflected in the enlarged image generated by the enlarged image generation unit 6 and in the composite display image formed by combining the image of the peripheral part of the vehicle 41 and the enlarged image generated by the enlarged image generation unit 6 with the composite display image generation unit 7.

For example, when the vehicle is in the driving state of perpendicular parking (left-in reverse parking) and the nearby object recognition unit 9 has detected an object around the rear part 33 of the vehicle, the composite display image of FIG. 16 that is in the driving state of perpendicular parking (left-in reverse parking) has displayed thereon the marker 333, the connecting line 433, and the enlarged image 233 but does not have displayed thereon the markers 332 and 334, the connecting lines 432 and 434, or the enlarged images 232 and 234.

It should be noted that when the detection of an object around the vehicle 41 with the nearby object recognition unit 9 or the nearby object sensor 10 has failed, the collision-warned part selection unit 3b outputs information indicating the absence of collision-warned parts of the vehicle 41 independently of the driving state.

When both the nearby object recognition unit 9 and the nearby object sensor 10 are included in the functional configuration of Embodiment 2, the collision-warned part selection unit 3b narrows the collision-warned parts down to a part of the vehicle around which an object has been detected with at least one of the nearby object recognition unit 9 and the nearby object sensor 10.

In the functional configuration of Embodiment 2, the collision-warned parts determined in accordance with the driving state are narrowed down to a part of the vehicle 41 around which an object is determined to exist, whereby parts that, in practice, have no possibility of hitting a nearby object (parts with little possibility of a collision) can be omitted from the enlarged images in the composite display image formed through a composite process by the composite display image generation unit 7.

Therefore, it is possible to reduce the burden of the driver watching the enlarged images of the parts of the vehicle that have no possibility of hitting a nearby object, thereby allowing the driver to attend to the visual check of the very part of the vehicle that has a possibility of hitting a nearby object.

Figure 20:
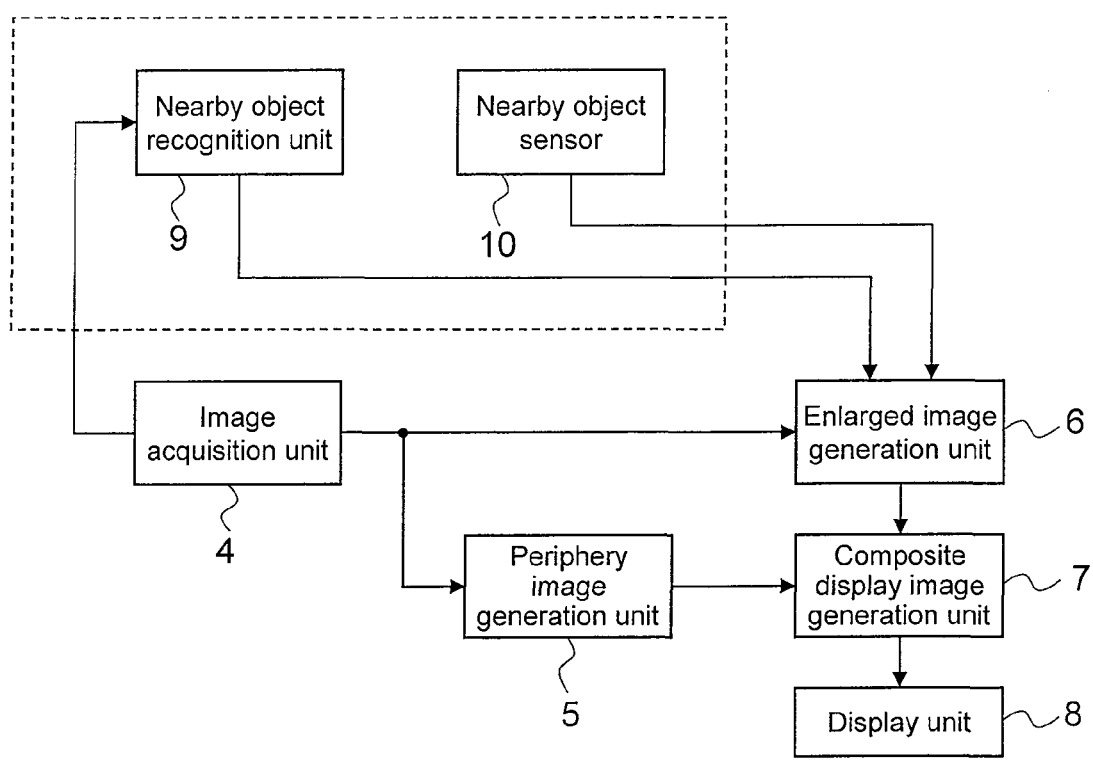
FIG. 20 is a functional block diagram showing a comparative example of the in-vehicle image display device in accordance with Embodiment 2.

It should be noted that the nearby object recognition unit 9 or the nearby object sensor 10, even when used alone, has a function of identifying a part of the vehicle 41 that has a possibility of hitting a nearby object. Thus, for comparison purposes, a functional configuration without the vehicle signal acquisition unit 1, the driving state estimation unit 2, and the collision-warned part selection unit 3b in Embodiment 2 is shown in the functional block of FIG. 20 as a comparative example. The functions of the units 4, 5, 6, 7, and 8 in FIG. 20 are identical to those of Embodiment 1. The functional configuration of FIG. 20 includes at least one of the nearby object recognition unit 9 and the nearby object sensor 10.

In the comparative example shown in FIG. 20, the nearby object recognition unit 9 or the nearby object sensor 10, upon detecting an object around the vehicle, generates an enlarged image of the area around a specific part (part of the vehicle 41 located close to the object) with the enlarged image generation unit 6. Then, the composite display image generation unit 7 displays a composite image of the image of the peripheral area of the vehicle 41 obtained with the periphery image generation unit 5 and the enlarged image of the area around the specific part of the vehicle 41 obtained with the enlarged image generation unit 6.

The comparative example shown in FIG. 20 is compared with the functional configuration of Embodiment 2 shown in FIG. 19: when an object exists around the vehicle 41 in the comparative example shown in FIG. 20, an enlarged image of the peripheral area of the object is displayed even if the vehicle 41 has no possibility of hitting the object. This can feel cumbersome for the driver.

For example, if stereoscopic objects are detected around the right part 36 and the left part 38 of the vehicle 41 and the specific parts of the vehicle 41 are set, it follows that nearby vehicles would be detected each time the vehicle stops at a traffic light on the heavily congested road, and enlarged images of the right part 36 and the left part 38 of the vehicle 41 would be frequently displayed, which can feel cumbersome for the driver.

In the functional configuration of Embodiment 2, parts of the vehicle 41 that have a possibility of hitting a nearby object are narrowed down in accordance with the driving state. Thus, enlarged images are not displayed at an undesired timing such as when stopping at a traffic light unlike with the functional configuration of FIG. 20. Thus, the in-vehicle image display device of Embodiment 2 is easy-to-use and would not feel cumbersome for the driver.

[Embodiment 3]

Figure 21:
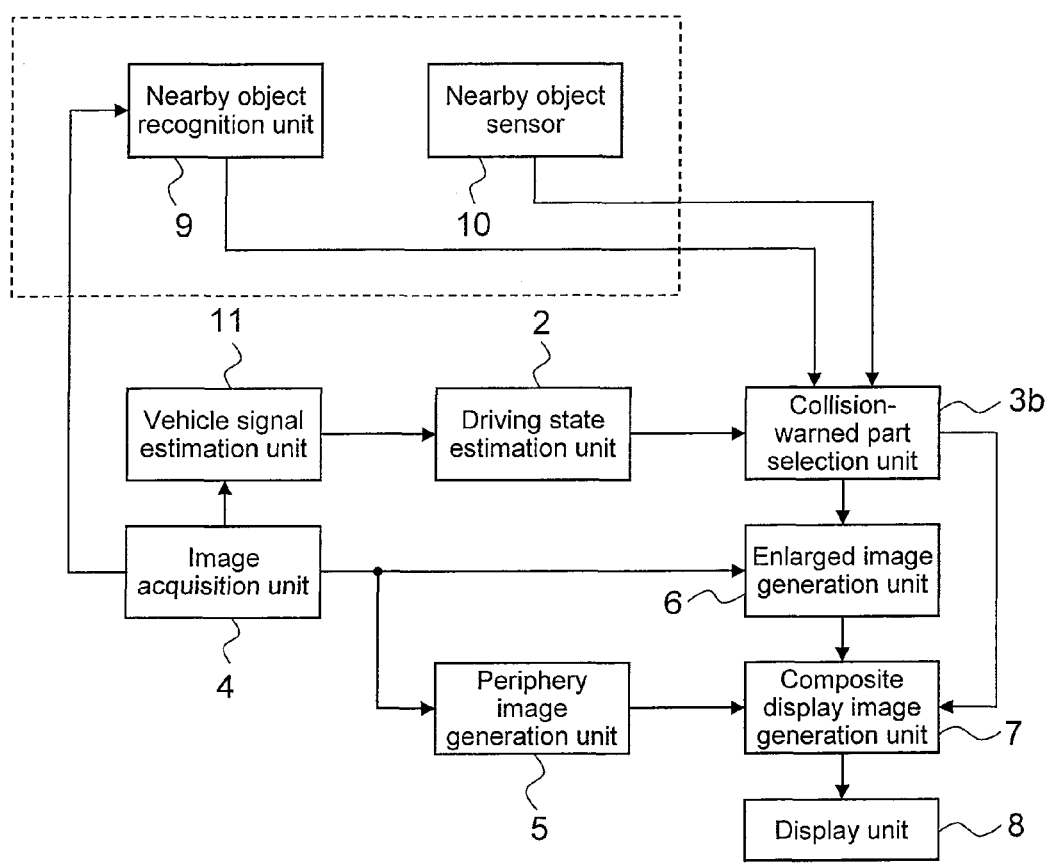
FIG. 21 is a functional block diagram of an in-vehicle image display device in accordance with embodiment 3.

FIG. 21 shows the functional configuration of Embodiment 3 of the present invention. In FIG. 21, the functions of the units 2, 3b, 4, 5, 6, 7, 8, 9, and 10 are identical to those of Embodiment 2. In Embodiment 3, either one or both of the functions of the nearby object recognition unit 9 and the nearby object sensor 10 can be provided or omitted. When both the functions of the nearby object recognition unit 9 and the nearby object sensor 10 (object detection unit) are omitted, the function of the collision-warned part selection unit 3b is the same as that of the collision-warned part selection unit 3 in Embodiment 1.

In Embodiment 3, the vehicle signal estimation unit 11 estimates the vehicle speed, gears, and the steering angle through image recognition from a temporal change of the camera images acquired with the image acquisition unit 4, and outputs them as vehicle signals to the driving state estimation unit 2. The driving state estimation unit 2 of Embodiment 3 estimates the vehicle driving state with the same function as that described in Embodiment 1 based on the premise that the vehicle signal estimation unit 11 outputs vehicle signals of about the same signals as the vehicle signal estimation unit 1 of Embodiment 1.

Figure 22:
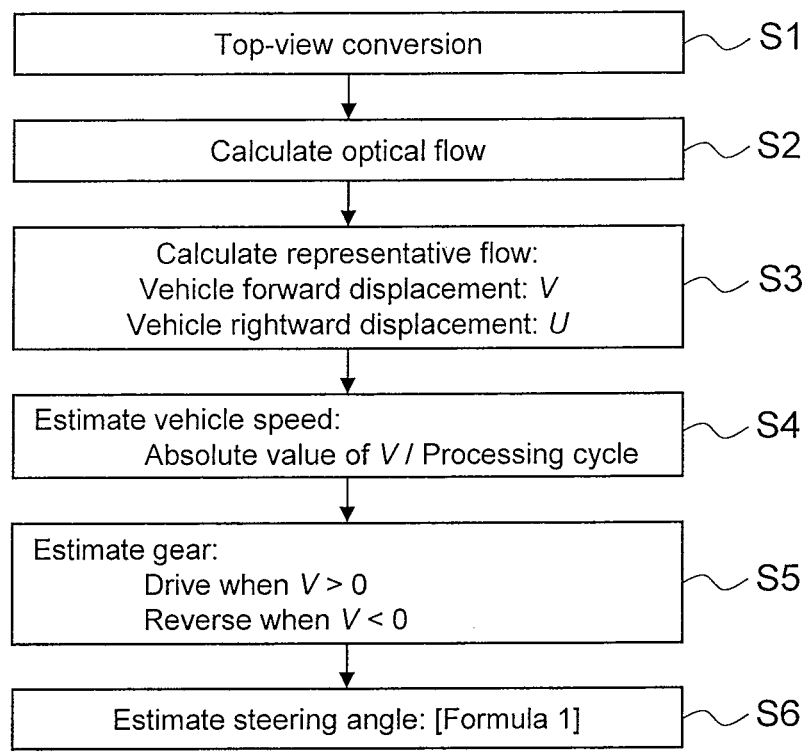
FIG. 22 is a flowchart illustrating a method for estimating vehicle signals with a vehicle signal estimation unit.

FIG. 22 is a flowchart illustrating a method for estimating vehicle signals with the vehicle signal estimation unit 11. The flowchart of FIG. 22 is repeated in a predetermined processing cycle, and the vehicle speed, gear position, and steering angle are estimated and output as vehicle signals in each processing cycle.

First, in step S1, a top-view image is formed through a viewpoint conversion process using the images captured with at least one of the cameras 51, 52, 53, and 54 installed on the vehicle 41 such that the resulting image appears to be viewed from a virtual viewpoint above the vehicle 41 with the ground as a reference. The top-view image in step S1 is formed such that the upward direction of the vehicle periphery image 100 coincides with the forward direction of the vehicle 41 and the rightward direction of the vehicle periphery image 100 coincides with the rightward direction of the vehicle 41 as with the vehicle periphery image 100 shown in FIG. 16.

Next, in step S2, an optical flow of images in the vertical direction and the horizontal direction is determined for each pixel on the top-view image, from a displacement of the top-view image formed in the current processing cycle from the top-view image formed in the previous processing cycle.

Next, in step S3, a forward displacement V of the vehicle 41 and a rightward displacement U of the vehicle 41 are determined from the central value of the distribution of the optical flow of each pixel determined in step S2. The forward displacement V of the vehicle 41, when the vehicle drives forward, indicates a positive sign, and when the vehicle drives in reverse, indicates a negative sign. Meanwhile, the rightward displacement U of the vehicle 41, when the vehicle drives to the right, indicates a positive sign, and when the vehicle drives to the left, indicates a negative sign.

In step S3, as the top-view image created in step S1 is based on the ground as a reference, the optical flow of step S2 can be recognized as the motion of the ground except the portion of a stereoscopic object.

In step S3, the central value of the distribution of the optical flow of each pixel determined in step S2 is determined based on the premise that the area of the ground surface is narrower than the area of the stereoscopic object in the top-view image of step S1, so that the motion of the ground relative to the vehicle 41 is determined. Specifically, when the vehicle drives in the opposite direction of the direction of the motion of the ground, e.g., when the ground moves in the rightward direction, the vehicle 41 is determined to be move in the leftward direction.

Then, in step S4, the absolute value |V| of the forward displacement V of the vehicle 41 is divided by the processing cycle to estimate the vehicle speed.

Next, in step S5, the gear position of the vehicle 41 is estimated. Herein, if the forward displacement V of the vehicle 41 is greater than 0, the gear is determined to be in "drive" position (forward) and if the forward displacement V of the vehicle 41 is less than 0, the gear is determined to be in "reverse" position (back). If the forward displacement V of the vehicle 41 is about 0, the gear is determined to be not fixed.

In step S6, an angle θ made by the forward displacement V of the vehicle 41 and the rightward displacement U of the vehicle 41 is determined from the following Formula (1) to determine the steering angle of the vehicle 41.

[Formula 1]

$$\theta = \tan^{-1}(U/|V|) \quad (1)$$

It should be noted that the image recognition process with the vehicle signal estimation unit 11, and the method for estimating vehicle signals such as the vehicle speed, gear position, and steering angle shown in FIG. 22 are only exemplary. Thus, the present invention can be realized with other image recognition methods or other methods for estimating vehicle signals such as the vehicle speed, gear position, and steering angle from the result of the image recognition as long as such methods allow the estimation of the vehicle speed, gear position, and steering angle.

According to Embodiment 3, even when vehicle signals cannot be acquired from a vehicle sensor, a steering angle sensor, a gear control device, or the like, the functional configurations of Embodiment 1 and Embodiment 2 can be realized by estimating vehicle signals through an image recognition process using as an input an image acquired with the image acquisition unit 4. Therefore, the in-vehicle image display device can be easily installed on the vehicle and can also be easily mounted later.

What is claimed is:

1. An in-vehicle image display device that displays images captured with a plurality of in-vehicle cameras, comprising:
    an image acquisition unit configured to acquire images captured with the in-vehicle cameras;
    a vehicle periphery image generation unit configured to generate an image of the peripheral area of the vehicle based on the images acquired with the image acquisition unit;
    a collision-warned part selection unit configured to select a collision-warned part of the vehicle that has a possibility of hitting a nearby object around the vehicle based on a driving state of the vehicle;
    an enlarged image generation unit configured to process at least one of the images acquired with the image acquisition unit to generate an enlarged image of a peripheral area of the collision-warned part of the vehicle selected by the collision-warned part selection unit;
    a composite display image generation unit configured to generate a composite display image composed of the enlarged image generated by the enlarged image generation unit and the image of the peripheral area of the vehicle generated by the vehicle periphery image generation unit, the composite display image being displayed in a form in which positions of the enlarged image and the image of the peripheral area of the vehicle are correlated with each other;
    a display unit configured to display the composite display image generated by the composite display image generation unit; and
    a driving state estimation unit configured to estimate the driving state of the vehicle based on a vehicle signal of the vehicle wherein:

the display unit displays a menu screen for setting a parameter for estimating the driving state of the vehicle, and the driving state estimation unit adjusts the estimation of the driving state of the vehicle in accordance with the parameter set through the menu screen.

2. The in-vehicle image display device according to claim 1, further comprising an object detection unit configured to detect an object existing around the vehicle, wherein:

the collision-warned part selection unit selects, from among candidate parts that can be the collision-warned part of the vehicle, a candidate part located near the object detected by the object detection unit, as the collision-warned part.

3. The in-vehicle image display device according to claim 2, wherein the object detection unit includes at least one of a nearby object detection sensor configured to detect an object existing around the vehicle, and a nearby object recognition unit configured to recognize an object existing around the vehicle based on the image of the peripheral area of the vehicle.

4. The in-vehicle image display device according to claim 1, further comprising:

a vehicle signal acquisition unit configured to acquire a vehicle signal of the vehicle; wherein:

the driving state estimation unit estimates the driving state of the vehicle based on the vehicle signal acquired with the vehicle signal acquisition unit, and the collision-warned part selection unit selects the collision-warned part based on the driving state of the vehicle estimated by the driving state estimation unit.

5. The in-vehicle image display device according to claim 1, further comprising:

a vehicle signal estimation unit configured to estimate a vehicle signal of the vehicle through image recognition using as an input the images acquired with the image acquisition unit; wherein the driving state estimation unit estimates the driving state of the vehicle based on the vehicle signal estimated by the vehicle signal estimation unit, and the collision-warned part selection unit selects the collision-warned part based on the driving state of the vehicle estimated by the driving state estimation unit.

6. The in-vehicle image display device according to claim 1, wherein:

the vehicle periphery image generation unit generates, as the image of the peripheral area of the vehicle, a top-view image through a viewpoint conversion process such that the resulting image appears to be viewed from a virtual viewpoint right above the vehicle, and the composite display image generation unit generates a composite display image in which the top-view image generated by the vehicle periphery image generation unit and the enlarged image generated by the enlarged image generation unit are arranged side-by-side.

7. The in-vehicle image display device according to claim 6, wherein the composite display image includes displayed thereon:

a marker indicating a position of the collision-warned part on the top-view image; and a connecting line that connects the marker and the enlarged image of the collision-warned part indicated by the marker.

8. The in-vehicle image display device according to claim 6, wherein the composite display image generation unit generates a composite display image having, on at least one of the enlarged image and the image of the peripheral area of the vehicle, a guide line that indicates a distance from the vehicle.

9. The in-vehicle image display device according to claim 6, wherein the composite display image generation unit generates a composite display image having, on at least one of the enlarged image and the image of the peripheral area of the vehicle, a semi-transparent image of the vehicle superimposed thereon.

10. The in-vehicle image display device according to claim 1, wherein the driving state estimated by the driving state estimation unit is at least one of perpendicular parking, parallel parking, forward parking, and driving past an oncoming vehicle.

* * * * *